(12) United States Patent
Sugano

(10) Patent No.: US 6,473,244 B1
(45) Date of Patent: Oct. 29, 2002

(54) PROJECTION LENS

(75) Inventor: Yasuyuki Sugano, Gunma (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 09/697,909

(22) Filed: Oct. 27, 2000

(51) Int. Cl.[7] .............................. G02B 9/06; G02B 9/04; G02B 25/00
(52) U.S. Cl. ........................ 359/794; 359/793; 359/651
(58) Field of Search ................................. 359/793, 794, 359/795, 790, 789, 784, 781, 772, 767, 764, 650, 651

(56) References Cited

U.S. PATENT DOCUMENTS 6,094,311 A * 7/2000 Moskovich .................. 359/651
6,160,671 A * 12/2000 Nakazawa .................. 359/749
6,195,209 B1 * 2/2001 Kreitzer et al. ............. 359/649

* cited by examiner

Primary Examiner—Georgia Epps
Assistant Examiner—Timothy J Thompson
(74) Attorney, Agent, or Firm—Jay H. Maioli

(57) ABSTRACT

A projection lens including a first lens group, a diaphragm, and a second lens group, which are disposed in that order from a screen to an image source. The first lens group includes an aspherical lens and at least one positive lens, and has a positive refractive power. The second lens group includes at least one set of combined lenses and an aspherical lens, and has a positive refractive power. A lens gap in the first lens group is moved to perform a focusing operation. It is possible to provide a wide-angle projection lens which uses few lenses and has a long back focus and focal length when BF/F is greater than 1.87, and HF2/F2 is greater than 0.22 but less than 0.57, where F denotes the focal length of the projection lens, BF denotes the distance in air from a last lens surface of the second lens group to the image source, F2 denotes the focal length of the second lens group, and HF2 denotes the location of a front principal point of the second lens group.

27 Claims, 33 Drawing Sheets

LOCATION OF DIAPHRAGM

FIG. 16A

F = 16.000    Fno = 2.8

| i | R | D | ND | VD | |
|---|---|---|---|---|---|
| 1 | 64.288 | 3.00 | 1.49150 | 58.00 | L1 ASPHERICAL LENS |
| 2 | 9.242 | VD1 | | | |
| 3 | 149.694 | 3.82 | 1.70201 | 29.81 | L2 |
| 4 | -41.702 | 0.00 | | | |
| 5 | Infinity | 18.87 | | | DIAPHRAGM |
| 6 | 213.007 | 2.00 | 1.80518 | 25.43 | L3, L4 COMBINED LENSES |
| 7 | 20.153 | 15.00 | 1.51633 | 64.15 | |
| 8 | -25.083 | 0.20 | | | |
| 9 | 56.936 | 8.00 | 1.49150 | 58.00 | L5 ASPHERICAL LENS |
| 10 | -63.761 | 5.00 | | | |
| 11 | Infinity | 35.00 | 1.51633 | 64.15 | PRISM |
| 12 | Infinity | VD2 | | | |

FIG. 16B

ASPHERICAL FACTOR

| i | K | A4 | A6 | A8 | A10 |
|---|---|---|---|---|---|
| 1 | 1.00000E+00 | 5.28982E-06 | -5.06261E-08 | 6.26462E-11 | -3.73395E-13 |
| 2 | -4.74831E-01 | -3.12192E-05 | -2.82030E-07 | 6.23183E-09 | -7.26680E-11 |
| 9 | -1.00000E+00 | -6.50118E-06 | 1.39095E-08 | -6.79194E-11 | 2.74076E-14 |
| 10 | 1.00000E+00 | -7.12418E-07 | -2.44843E-08 | 2.75388E-12 | -1.07715E-13 |

FIG. 16C

VARIABLE GAP BETWEEN LENS SURFACES

| PROJECTION MAGNIFICATION | ∞ | 66.67 | 55.56 | 44.44 |
|---|---|---|---|---|
| VD1 | 24.11 | 24.58 | 24.67 | 24.81 |
| VD2 | 5.00 | 5.00 | 5.00 | 5.00 |

FIG. 17A

F = 16.000    Fno = 2.8

| i | R | D | ND | VD | |
|---|---|---|---|---|---|
| 1 | -276.961 | 2.00 | 1.4915 | 58.00 | L1 |
| 2 | 14.402 | VD1 | | | ASPHERICAL LENS |
| 3 | 91.427 | 3.69 | 1.6887 | 40.65 | L2 |
| 4 | -74.201 | 0.00 | | | |
| 5 | Infinity | 24.49 | | | DIAPHRAGM |
| 6 | -19.340 | 3.60 | 1.4915 | 58.00 | L3 |
| 7 | -19.764 | 6.42 | | | ASPHERICAL LENS |
| 8 | 619.465 | 7.61 | 1.5163 | 64.15 | L4 |
| 9 | -33.694 | 0.20 | | | |
| 10 | 75.505 | 2.00 | 1.8052 | 25.43 | L5, L6 |
| 11 | 22.300 | 12.72 | 1.5163 | 64.15 | COMBINED LENSES |
| 12 | -46.599 | 5.00 | | | |
| 13 | Infinity | 35.00 | 1.5163 | 64.15 | PRISM |
| 14 | Infinity | VD2 | | | |

FIG. 17B

ASPHERICAL FACTOR

| i | K | A4 | A6 | A8 | A10 |
|---|---|---|---|---|---|
| 1 | 1.00000E+00 | 9.72672E-06 | -1.93092E-08 | 1.26183E-11 | 0.00000E+00 |
| 2 | -5.26784E-01 | -1.36501E-05 | 8.36044E-08 | -3.55243E-10 | 0.00000E+00 |
| 6 | 3.88336E-02 | -1.98558E-08 | 9.77243E-08 | -9.17794E-10 | 0.00000E+00 |
| 7 | -5.29780E-01 | 8.77735E-08 | 1.99635E-08 | -2.85547E-10 | 0.00000E+00 |

FIG. 17C

VARIABLE GAP BETWEEN LENS SURFACES

| PROJECTION MAGNIFICATION | ∞ | 66.67 | 55.56 | 44.44 |
|---|---|---|---|---|
| VD1 | 39.28 | 40.01 | 40.15 | 40.37 |
| VD2 | 3.00 | 3.00 | 3.00 | 3.00 |

FIG. 18A

F = 16.000    Fno = 2.8

| i | R | D | ND | VD | |
|---|---|---|----|----|---|
| 1 | -296.882 | 5.00 | 1.4915 | 58.00 | L1 |
| 2 | 13.616 | VD1 | | | ASPHERICAL LENS |
| 3 | 82.241 | 2.97 | 1.7000 | 51.06 | L2 |
| 4 | -67.949 | 0.20 | | | |
| 5 | Infinity | 26.20 | | | DIAPHRAGM |
| 6 | -35.682 | 6.40 | 1.4915 | 58.00 | L3 |
| 7 | -25.005 | 3.99 | | | ASPHERICAL LENS |
| 8 | 61.404 | 2.00 | 1.8052 | 25.43 | L4, L5 |
| 9 | 22.140 | 14.82 | 1.5538 | 63.93 | COMBINED LENSES |
| 10 | -33.319 | 5.00 | | | |
| 11 | Infinity | 35.00 | 1.5163 | 64.15 | PRISM |
| 12 | Infinity | VD2 | | | |

FIG. 18B

ASPHERICAL FACTOR

| i | K | A4 | A6 | A8 | A10 |
|---|---|----|----|----|-----|
| 1 | 1.00000E+00 | 1.06280E-05 | -2.19689E-08 | 1.38520E-11 | -6.40031E-15 |
| 2 | -5.91408E-01 | -1.10382E-05 | 1.15075E-07 | -3.67090E-10 | -8.02287E-13 |
| 6 | 6.70871E-01 | -1.15207E-05 | 7.74700E-08 | -1.21324E-09 | -1.89687E-12 |
| 7 | -3.48980E-01 | 4.75887E-05 | 1.02154E-08 | -4.44950E-10 | -5.75300E-13 |

FIG. 18C

VARIABLE GAP BETWEEN LENS SURFACES

| PROJECTION MAGNIFICATION | ∞ | 66.67 | 55.56 | 44.44 |
|---|---|---|---|---|
| VD1 | 40.43 | 41.08 | 41.21 | 41.40 |
| VD2 | 3.00 | 3.00 | 3.00 | 3.00 |

FIG. 19A

F = 16.000  Fno = 2.4

| i | R | D | ND | VD | |
|---|---|---|---|---|---|
| 1 | 82.089 | 3.00 | 1.49150 | 58.00 | L1 ASPHERICAL LENS |
| 2 | 20.646 | VD1 | | | |
| 3 | 78.090 | 2.00 | 1.70000 | 55.30 | L2 |
| 4 | 18.049 | 16.98 | | | |
| 5 | 58.812 | 4.03 | 1.66739 | 37.97 | L3 |
| 6 | -42.1450 | 0.20 | | | |
| 7 | Infinity | 27.15 | | | DIAPHRAGM |
| 8 | -220.904 | 2.00 | 1.80518 | 25.43 | L4, L5 COMBINED LENSES |
| 9 | 25.171 | 11.72 | 1.60000 | 60.80 | |
| 10 | -33.843 | 0.20 | | | |
| 11 | 37.804 | 8.00 | 1.49150 | 58.00 | L6 ASPHERICAL LENS |
| 12 | -105.551 | 5.00 | | | |
| 13 | Infinity | 35.00 | 1.51633 | 64.15 | PRISM |
| 14 | Infinity | VD2 | | | |

FIG. 19B

ASPHERICAL FACTOR

| i | K | A4 | A6 | A8 | A10 |
|---|---|---|---|---|---|
| 1 | -2.73964E-01 | 5.76214E-06 | -9.97685E-09 | 7.38085E-12 | -1.13115E-14 |
| 2 | -6.98229E-02 | -2.17681E-06 | -3.65249E-08 | 1.38905E-10 | -5.11121E-13 |
| 11 | -9.14518E-02 | 1.24378E-07 | 6.75706E-09 | 3.78216E-12 | 1.40779E-13 |
| 12 | -1.00000E+00 | 6.32573E-06 | -4.06288E-09 | 2.62635E-11 | 1.11228E-13 |

FIG. 19C

VARIABLE GAP BETWEEN LENS SURFACES

| PROJECTION MAGNIFICATION | ∞ | 66.67 | 55.56 | 44.44 |
|---|---|---|---|---|
| VD1 | 19.72 | 22.75 | 23.35 | 24.25 |
| VD2 | 5.00 | 5.00 | 5.00 | 5.00 |

FIG. 20A

F = 16.000     Fno = 2.4

| i | R | D | ND | VD | |
|---|---|---|---|---|---|
| 1 | 79.444 | 3.00 | 1.49150 | 58.00 | L1 |
| 2 | 20.571 | 23.03 | | | ASPHERICAL LENS |
| 3 | 142.440 | 2.00 | 1.70000 | 55.30 | L2 |
| 4 | 18.735 | VD1 | | | |
| 5 | 59.386 | 4.01 | 1.71638 | 39.62 | L3 |
| 6 | -40.767 | 0.20 | | | |
| 7 | Infinity | 26.98 | | | DIAPHRAGM |
| 8 | -276.168 | 2.00 | 1.80518 | 25.43 | L4, L5 |
| 9 | 25.282 | 11.71 | 1.58557 | 81.29 | COMBINED LENSES |
| 10 | -32.974 | 0.20 | | | |
| 11 | 40.825 | 8.00 | 1.49150 | 58.00 | L6 |
| 12 | -82.238 | 5.00 | | | ASPHERICAL LENS |
| 13 | Infinity | 35.00 | 1.51633 | 64.15 | PRISM |
| 14 | Infinity | VD2 | | | |

FIG. 20B

ASPHERICAL FACTOR

| i | K | A4 | A6 | A8 | A10 |
|---|---|---|---|---|---|
| 1 | 6.60612E-02 | 5.84357E-06 | -9.70256E-09 | 7.44710E-12 | -1.58696E-14 |
| 2 | -8.00914E-02 | -2.81772E-06 | -2.82037E-08 | 1.43418E-10 | -5.85979E-13 |
| 11 | -4.30147E-03 | 3.23274E-07 | 8.62923E-09 | 2.31519E-12 | 1.44903E-13 |
| 12 | -1.00000E+00 | 7.25029E-06 | -4.76428E-09 | 2.69058E-11 | 1.18660E-13 |

FIG. 20C

VARIABLE GAP BETWEEN LENS SURFACES

| PROJECTION MAGNIFICATION | ∞ | 66.67 | 55.56 | 44.44 |
|---|---|---|---|---|
| VD1 | 13.86 | 14.11 | 14.16 | 14.23 |
| VD2 | 5.00 | 5.00 | 5.00 | 5.00 |

PROJECTION LENS

BACKGROUND OF THE INVENTION

1. Field of the Invention

The present invention relates to a projection lens, and, more particularly, to a projection lens suitable for use in, for example, a projector of a projection display device.

2. Description of the Related Art

In recent years, the use of a projection display device is becoming widespread.

What is called a rear projection display device is known as one type of projection display device. In the rear projection display device, image light is projected onto a transmissive screen from the back surface side thereof in order to display an image.

What is called a three-plate projection display device which includes two-dimensional image display devices (that is, light valves) provided in correspondence with three colors, red (R), green (G), and blue (B), is known as one type of rear projection display device. In the three-plate projection display device, light beams from a white light source and collimated by, for example, a reflector is separated into light beams of the three different colors, a red light beam, a green light beam, and a blue light beam, by a color-separating mirror.

Then, the light beams of the three different colors impinge upon the corresponding two-dimensional image display devices (such as liquid crystal displays (LCD)) formed in correspondence with a red (R) image electrical signal, a green (G) image electrical signal, and a blue (B) image electrical signal. Image light beams obtained at the two-dimensional image display devices formed in correspondence with their respective colors, red, green, and blue, are synthesized into a white image light beam by a color synthesizing optical system in order to be projected in enlarged form onto a transmissive screen through a projection lens.

Another type of three-plate projection display device is known. In this type, light beams emitted from light sources (such as light-emitting diodes (LED) or lasers) which emit light beams of three different colors, a red light beam, a green light beam, and a blue light beam, are collimated. The collimated light beams are made to impinge upon corresponding two-dimensional image display devices formed in correspondence with a red (R) image electrical signal, a green (G) image electrical signal, and a blue (B) image electrical signal. Image light beams obtained at their corresponding two-dimensional image display devices formed in correspondence with their respective colors, red (R), green (G), and blue (B), are synthesized into a white image light beam by a color synthesizing optical system in order to be projected in enlarged form onto a transmissive screen through a projection lens.

What is called a single-plate projection display device which includes one two-dimensional image display device is also known.

In one type of known single-plate projection display device, light sources which emit light beams of three different colors, a red light beam, a green light beam, and a blue light beam, are made to emit or transmit light based on time division. Then, in accordance with the timings of the passages of the light beams of the three different colors from the light sources, driving operations using a red (R) image electrical signal, a green (G) image electrical signal, and a blue (B) image electrical signal corresponding thereto are performed on one two-dimensional image display device in order to project an image in enlarged form onto a transmissive screen through a projection lens.

In another type of known single-plate projection display device, color filters for passing light beams of three different colors, red, green, and blue, are formed with every one pixel on a panel. A white light beam is made to impinge upon one two-dimensional image display device. Then, the light which has passed through the two-dimensional image display device is projected in enlarged form onto a transmissive screen through a projection lens.

In still another type of known single-plate projection display device, white light is made to impinge upon three dichroic mirrors disposed at very small angles. The light beams are separated into three different color light beams with each angle in order to obtain a red light beam, a green light beam, and a blue light beam. The obtained light beams are made to impinge upon one two-dimensional image display device. On the two-dimensional image display device, the light beams are collimated by very small lenses formed in correspondence with sets of three image pixels formed in correspondence with the three colors, red (R), green (G), and blue (B). Each color pixel is driven by its corresponding color image electrical signal. The light beams which have impinged upon their corresponding pixels are projected in enlarged form onto a transmissive screen through a projection lens.

Considering, for example, the limitations caused by a quick return mirror, various lenses having structures similar to that of the projection lens installed in each of the above-described projection display devices have been proposed. They include a wide-angle photographic lens for a single-lens reflex camera having a long back focus and a wide-angle projection lens for a projection television using a CRT (cathode ray tube).

In the structure of each projection display device described above, an optical element, such as a dichroic prism or a dichroic mirror, may be disposed as a color-light synthesizing system. In the case where a reflective, two-dimensional image display device is used, an optical element, such as a polarization beam splitter prism or a polarization beam splitter mirror, may be disposed. In these cases, the back focus which corresponds to the distance from the two-dimensional image display device to the last end of the projection lens needs to be made long.

In a projection display device which forms an image in enlarged form on the entire transmissive screen using one projector, in order to make the projection display device itself more compact, it is necessary to reduce the projection distance (for example, the length of the center light beam measured from a light-exiting end of the projection lens to the transmissive screen through a projection lens). To reduce the projection distance, it is necessary to increase the divergence angle of the exiting lens as a result of forming the projection lens into a wide-angle lens in order to form a large screen.

In order to improve color uniformity on the screen onto which image light beams are projected, it is preferable that the angle width of the light beams which strike the coated surfaces of, for example, a polarization beam splitter prism or a polarization beam splitter mirror (used when a dichroic prism or a dichroic mirror, used as a color synthesizing optical system, and a reflective two-dimensional image device are used) be fixed.

Therefore, the projection lens needs to be telecentric so that a principal ray from abaxial point to the projection lens is perpendicular to the two-dimensional display device. Here, the projection lens is symmetrical with respect to the optical axis which passes through the center of the two-dimensional display device, whereas the two-dimensional display device itself has a high contrast in only one direction. Therefore, the light beam itself which is shed upon the two-dimensional display device needs to be shed at an angle.

For a two-dimensional image display device, a liquid crystal display (LCD) or the like is ordinarily used. The liquid crystal display is driven using a matrix electrode. Therefore, unlike the case where a cathode ray tube (CRT) is used, it is difficult to correct distortion of the projection lens. More specifically, when a cathode ray tube is used, distortion of the projection lens can be relatively easily corrected by using a function for correcting a raster form such as a pincushion distortion correction function. However, when a liquid crystal display device which performs a dot-matrix display operation is used, corrections of raster distortion are ordinarily not carried out.

From the above, it is preferable that distortion of the projection lens be as small as possible. However, this is a barrier to obtaining a wide-angle lens having a long back focus.

In other words, when the projection lens which is formed so as to have a wide angle and a long back focus is made telecentric, the overall length and the diameter of the lens tend to become large.

In a wide-angle photographic lens for a single-lens reflex camera and a projection lens for a projection television using a cathode ray tube, the back focal length is insufficient and the incident angle and the exiting angle of an abaxial light beam are large, so that, in the present condition, they are not telecentric and the relative illuminance at corner is small.

In recent years, there has been a demand for a high-resolution lens in correspondence with the production of finer light valves. The production of lenses having higher resolution has caused the problem of color misalignment in the pixels due to chromatic aberration at a peripheral portion of the screen.

In a projection display device having a structure in which an optical path within a projection lens is changed, what is called a total drawing-out method is used as a focusing method. In this method, the position of the focus is obtained by adjusting, for example, the distance between the whole projection lens and the screen relative to each other. When this method is used, the center of the image on the screen is shifted, so that it is known that the total drawing-out method is not an appropriate method. Therefore, in such a projection display device, a focusing method other than the total drawing-out method needs to be used.

In a projection display device, even if a housing having a size which is different from the size of the screen is used, the same projection lens can be used by adjusting the distance between the projection lens and the screen relative to each other. Here, aberrations (such as distortion and chromatic aberration of magnification) occur as a result of, for example, slight differences in the angles of the light beams which converge on the screen or errors in producing projection lenses. Therefore, it is necessary to make adjustments so that aberrations are made as small as possible.

From the point of view of costs, it is preferable to cut costs of the projection lens itself. One method of achieving this is to reduce the number of lenses making up the projection lens.

SUMMARY OF THE INVENTION

Accordingly, in view of the above-described problems, it is an object of the present invention to provide a projection lens which provides high optical performance to the extent possible even if few lenses are used. In other words, it is an object of the present invention to provide a wide-angle projection lens which is telecentric and has a long back focus even if the projection distance is short, and whose aberrations are small.

To this end, according to a first aspect of the present invention, there is provided a projection lens comprising a first lens group, a diaphragm, and a second lens group, which are disposed in that order from a long conjugate side to a short conjugate side. The first lens group comprises an aspherical lens disposed at a long conjugate side, and at least one positive lens, so that the first lens group as a whole has a positive refractive power. The second lens group comprises at least one set of combined lenses, and an aspherical lens, so that the second lens group as a whole has a positive refractive power. When the first lens group and the second lens group have these structures and properties, a focusing operation is carried out by moving a gap between predetermined lenses in the first lens group, and the following conditional expressions are satisfied:

$1.87 < BF/F$ $0.22 < HF2/F2 < 0.57$ where F denotes the focal length of the whole system, BF denotes the distance in air from a last lens surface of the second lens group to a small conjugate point when the projection magnification is a predetermined value, F2 denotes the focal length of the second lens group, and HF2 denotes the location of a front principal point of the second lens group.

According to a second aspect of the present invention, there is provided a projection lens comprising a first lens group, a diaphragm, and a second lens group, which are disposed in that order from a long conjugate side to a short conjugate side. The first lens group comprises a convex-shaped meniscus lens disposed at the long conjugate side, and at least one positive lens, so that the first lens group as a whole has a positive refractive power. The second lens group comprises at least one set of combined lenses and an aspherical lens, so that the second lens group as a whole has a positive refractive power. When the first lens group and the second lens group have these structures and properties, a gap between predetermined lenses of the first lens group is moved in order to perform a focusing operation, and the following conditional expressions are satisfied:

$1.87 < BF/F$ $0.22 < HF2/F2 < 0.57$ where F denotes the focal length of the whole system, BF denotes the distance in air from a last lens surface of the second lens group to a small conjugate point when the projection magnification is a predetermined value, F2 denotes the focal length of the second lens group, and HF2 denotes the location of a front principal point of the second lens group.

According to a third aspect of the present invention, there is provided a projection lens comprising a first lens group, a diaphragm, and a second lens group, which are disposed in that order from a long conjugate side to a short conjugate side. The first lens group comprises two lens subgroups comprising two lenses, an aspherical lens disposed at a long conjugate side, and a positive lens, so that the first lens group as a whole has a positive refractive power. The second lens group comprises two lens subgroups comprising three lenses, a set of combined lenses and an aspherical lens, so that the second lens group as a whole has a positive refractive power. When the first lens group and the second lens group have these structures and properties, a gap between predetermined lenses in the first lens group is moved in order to perform a focusing operation, and the following conditions are satisfied:

$$1.87 < BF/F$$

$$0.22 < HF2/F2 < 0.57$$

where F denotes the focal length of the whole system, BF denotes the distance in air from a last lens surface of the second lens group to a small conjugate point when the projection magnification is a predetermined value, F2 denotes the focal length of the second lens group, and HF2 denotes the location of a front principal point of the second lens group.

According to a fourth aspect of the present invention, there is provided a projection lens comprising a first lens group, a diaphragm, and a second lens group, which are disposed in that order from a long conjugate side to a short conjugate side. The first lens group comprises two lens subgroups comprising two lenses, an aspherical lens disposed at a long conjugate side, and a positive lens, so that the first lens group as a whole has a positive refractive power. The second lens group comprises either two lens subgroups or three lens subgroups, the two lens subgroups comprising three lenses, an aspherical lens disposed closest to the diaphragm, and combined lenses, and the three lens subgroups comprising four lenses, an aspherical lens disposed closest to the diaphragm, a positive lens, and combined lenses, so that the second lens group as a whole has a positive refractive power. When the first lens group and the second lens group have these structures and properties, a gap between predetermined lenses in the first lens group is moved to perform a focusing operation, and the following conditions are satisfied:

$$1.87 < BF/F$$

$$0.22 < HF2/F2 < 0.57$$

where F denotes the focal distance of the whole system, BF denotes the distance in air from a last lens surface of the second lens group to a small conjugate point when the projection magnification is a predetermined value, F2 is the focal length of the second lens group, and HF2 is the location of a front focal point of the second lens group.

According to a fifth aspect of the present invention, there is provided a projection lens comprising a first lens group, a diaphragm, and a second lens group, which are disposed in that order from a long conjugate side to a short conjugate side. The first lens group comprises either two lens subgroups or three lens subgroups, the two lens subgroups comprising two lenses, an aspherical lens disposed at a long conjugate side, and a positive lens, and the three lens subgroups comprising three lenses, an aspherical lens disposed at the long conjugate side, a negative meniscus lens, and a positive lens, so that the first lens group as a whole has a positive refractive power. The second lens group comprises two lens subgroups including three lenses, a set of combined lenses and an aspherical lens disposed at a short conjugate side, so that the second lens group has as a whole a positive refractive power. When the first lens group and the second lens group have these structures and properties, a gap between predetermined lenses in the first lens group is moved to perform a focusing operation, and the following conditional expressions are satisfied:

$$1.87 < BF/F$$

$$0.22 HF2/F2 < 0.57$$

where F is the focal length of the whole system, BF is the distance in air from a last lens surface of the second lens group to a small conjugate point when the projection magnification is a predetermined value, F2 is the focal length of the second lens group, and HF2 is the location of a front principal point of the second lens group.

According to the present invention, when the lenses in each of the above-described structures are arranged as described above, and satisfy each of the conditional expressions, the conditions for obtaining a projection lens which has its projection distance kept short while having a large angle of view and a long back focus, and which has its telecentric property maintained when few lenses are used are satisfied.

BRIEF DESCRIPTION OF THE DRAWINGS

FIGS. 9A–D illustrates the relationship between the location of a diaphragm and the telecentric property in relation to a chief light beam.

FIGS. 10A–D illustrates a focusing method.

FIGS. 16A–C illustrates a numerical example of the first embodiment of the projection lens.

FIGS. 17A–C illustrates a numerical example of the second embodiment of the projection lens.

FIGS. 18A–C illustrates a numerical example of the third embodiment of the projection lens.

FIGS. 19A–C illustrates a numerical example of the fourth embodiment of the projection lens.

FIGS. 20A–C illustrates a numerical example of the fifth embodiment of the projection lens.

DESCRIPTION OF THE PREFERRED EMBODIMENTS

Figure 1:
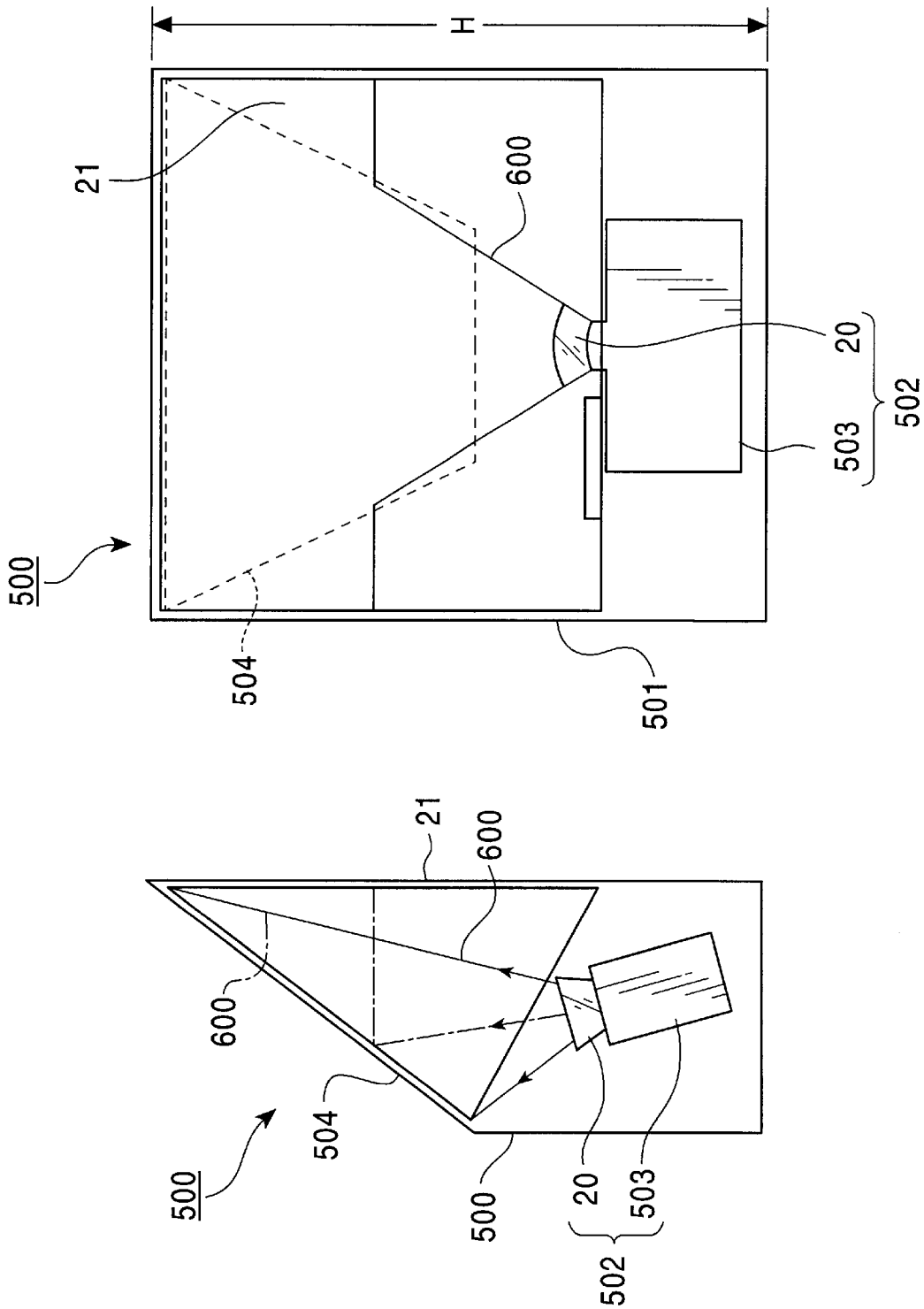
FIGS. 1A and 1B illustrate the overall structure of a projection display device including an embodiment of a projection lens in accordance with the present invention.

Hereunder, a description of embodiments of a projection lens in accordance with the present invention will be given. In the embodiments, the projection lenses are described as being incorporated in a projector of a rear projection display device using liquid crystal displays as two-dimensional image display devices.

The description of the invention will be given in the following order:

1. Structure of Projection Display Device
   1-1. Overall structure
   1-2. Internal structure of projector (first example)
   1-3. Internal structure of projector (second example)
   1-4. Internal structure of projector (third example)
   1-5. Internal structure of projector (fourth example)
2. Lenses
3. Structure of Projection Lens
   3-1. Configuration of lens elements
   3-2. Conditional expressions
   3-3. Numerical examples, etc.
1. Structure of Projection Display Device
   1-1. Overall structure A description of the overall structure of a projection display device which incorporates a projector including an embodiment of a projection lens will first be given.

FIGS. 1A and 1B are a side view and a front view of the overall structure of the projection display device, respectively.

In a projection display device 500 shown in these figures, a bending mirror 504 is provided at the rear surface of a cabinet 501, and a transmissive screen 21 is provided at the front surface of the cabinet 501. The bending mirror 504 is mounted at an angle which allows it to reflect image light projected from a projector 502 (described next) and to project the reflected image light onto the screen 21.

As shown in the figures, the projector 502 is disposed at the lower side inside the cabinet 501.

Optical parts, such as a light source (described later), dichroic mirrors, liquid crystal panel blocks (that is, light valves), and a dichroic prism (that is, a light-synthesizing device) are disposed inside an optical unit 503 of the projector 502. These optical parts function in order to obtain a light beam serving as an image light beam. The light beam obtained as an image light beam is projected by a projection lens 20, and exits therefrom as a projection light beam 600.

In the projection display device 500 having such a structure, the projection light beam 600 exits upward from the projection lens 20 so as to illuminate the bending mirror 504. Then, the path of the projection light beam 600 which has exited from the projection lens 20 is bent by the bending mirror 504. The projection light beam 600 whose path has been bent illuminates the screen 21.

An enlarged image obtained by the projection light beam 600 projected from the projection lens 20 is displayed on the screen 21. For example, the image displayed on the screen 21 is viewed from a side which is opposite to the side where the projection lens 20 is disposed.

The projection display device to which the present invention may be applied is not limited to the projection display device having the structure shown in FIG. 1. For example, depending upon the direction to which the direction of the optical path in the projection lens of the projector is changed, the disposition of the projector in the cabinet of the projection display device may be changed as necessary. A structure which includes a mirror in an optical path in the projector 502 to change the optical path of a light beam is known as a structure which takes into consideration, for example, size reduction of the projection display device. In the present invention, a structure which changes the optical path in the projector 502 may or may not be used.

1-2. Internal structure of projector (first example)

A description of the internal structure of the projector 502 shown in FIG. 1 will be described with reference to FIG. 2.

Figure 2:
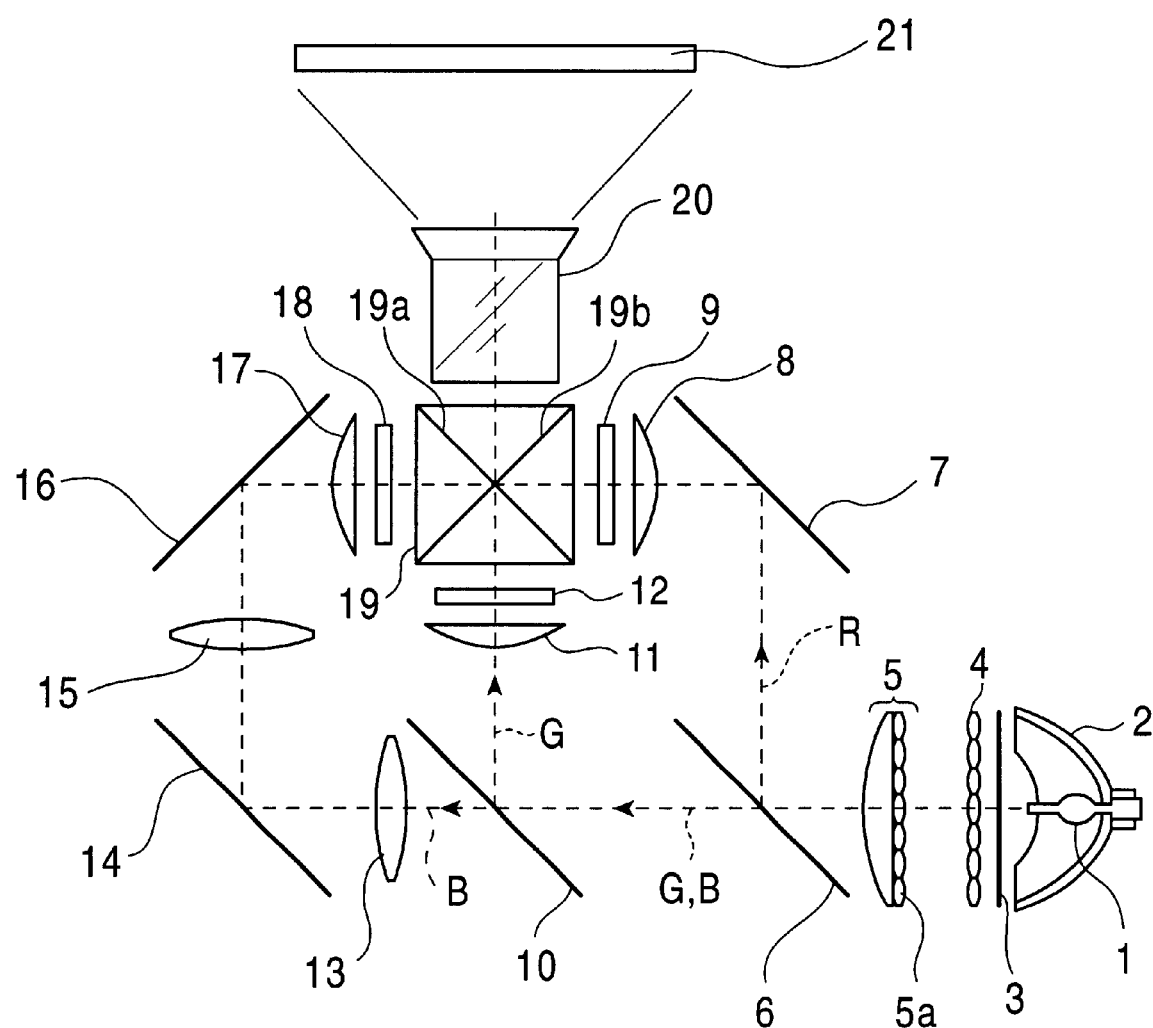
FIG. 2 illustrates a first example of a structure of the projection display device including an embodiment of a projection lens in accordance with the present invention.

FIG. 2 conceptually illustrates the first example of the internal structure of the projector 502 which incorporates an embodiment of a projection lens. Here, the portions other than the screen 21 form the projector 502.

As shown in FIG. 1, in the structure of the projection display device, the bending mirror 504 is provided between the projection lens 20 and the screen 21 to change the optical path. Here, for the sake of primarily illustrating the internal structure of the projector 502, the bending mirror 504 is not shown in FIG. 2.

In the projector 502 shown in FIG. 2, a lamp 1 serving as a light source (such as a metal halide lamp) is disposed at the focus of a reflector 2 (which is a parabolic mirror). Light beams emitted from the lamp 1 are reflected by the reflector 2 in order to collimate them substantially parallel to the optical axis. The collimated light beams exit from an opening in the reflector 2.

Of the light beams which have exited from the opening of the reflector 2, undesired light beams which fall in the infrared region and ultraviolet region are blocked by an IR-UV cut filter 3, so that only the light beams effective in displaying an image are guided to various optical elements disposed behind the IR-UV cut filter 3.

A multi-lens array 4 followed by a multi-lens array 5 are disposed behind the IR-UV cut filter 3.

Here, the multi-lens array 4 comprises a plurality of convex lenses which have similar external shapes equivalent to the aspect ratio of an effective opening of each liquid crystal panel block serving as a light-modulating means (described later). They are disposed in a zigzagged checkered pattern arrangement with, for example, 1/2 phase shifts. The multi-lens array 4 has a flat shape.

The multi-lens array 5 comprises a plurality of convex lenses 5a disposed at a side opposing the convex lenses of the multi-lens array 4. The multi-lens array 5 is a plano-convex-type lens array.

By disposing the multi-lens array 4 and the multi-lens array 5, the light beams which have passed through the IR-UV cut filter 3 efficiently and uniformly illuminate the effective openings of the liquid crystal panel blocks (described later).

Dichroic mirrors 6 and 10 are disposed between the multi-lens array 5 and the effective openings of the liquid crystal panel blocks in order to separate the light beams from the lamp 1 into a red light beam, a green light beam, and a blue light beam.

In the projector 502 shown in FIG. 2, the red light beam R is reflected by the dichroic mirror 6, whereas the green light beam G and the blue light beam B pass therethrough. The red light beam R reflected by the dichroic mirror 6 has its direction of propagation bent by 90 degrees by a mirror 7, and is guided to a condenser lens 8 disposed in front of a red-light liquid crystal panel block 9.

On the other hand, the green light beam G and the blue light beam B which have passed through the dichroic mirror 6 are separated by the dichroic mirror 10. More specifically, the green light beam G is reflected, has its direction of propagation bent by 90 degrees, and is guided to a condenser lens 11 disposed in front of a green-light liquid crystal panel 12. The blue light beam B passes through the dichroic mirror 10, and travels in a straight line to be guided to a condenser lens 17 disposed in front of a blue-light liquid crystal panel 18 through a relay lens 13, a mirror 14, an inversion relay lens 15, and a mirror 16.

Accordingly, the red light beam R, the green light beam G, and the blue light beam B pass through their corresponding condenser lenses 8, 11, and 17, and are incident upon their corresponding liquid crystal panel blocks 9, 12, and 18 (which correspond to light valves).

The liquid crystal panel blocks 9, 12, and 18 each comprise a liquid crystal panel and an incident-side polarizer for causing the polarization directions of incident light beams before they impinge upon their corresponding liquid crystal panels to be the same. What is called an analyzer for transmitting exited light having a predetermined polarization plane is disposed behind each liquid crystal panel in order to modulate the strength of the light by the voltage of a circuit for driving the liquid crystals.

In general, in order to effectively use the properties of the dichroic mirrors 6 and 10, reflection and transmission properties at p-polarized-wave planes are used. Therefore, the incident-side polarizers of the corresponding liquid crystal panel blocks 9. 12, and 18 are disposed so that light is transmitted through parallel polarization planes within the plane of FIG. 2.

The liquid crystal panels of their corresponding liquid crystal panel blocks 9, 12, and 18 are, for example, TN (twisted nematic) liquid crystal panels. They are constructed so as to operate in, for example, what is called a normally white mode. Each analyzer is disposed so as to transmit polarized light beams perpendicular to the plane of FIG. 1.

The color light beams which have been modulated by their corresponding liquid crystal panel blocks 9, 12, and 18 impinge upon corresponding illustrated surfaces of a light-synthesizing device (that is, a cross dichroic prism) 19. The light-synthesizing device 19 is formed by forming a combination of reflective films 19a and 19b at a prism having a predetermined shape.

At the light-synthesizing device 19, the red light beam R is reflected by the reflective film 19a, while the blue light beam B is reflected by the reflective film 19b, after which both of the light beams R and B are incident upon the projection lens 20. The green light beam G passes in a straight line into the light-synthesizing device 19 in order to be incident upon the projection lens 20. This causes the light beams R, G, and B to be synthesized into one light beam, so that they impinge upon the projection lens 20 as one light beam.

The projection lens 20 converts the light beam incident thereupon from the light-synthesizing device 19 into a projection light beam, which is projected on, for example, the transmissive screen 21.

1-3. Internal structure of projector (second example)

Figure 3:
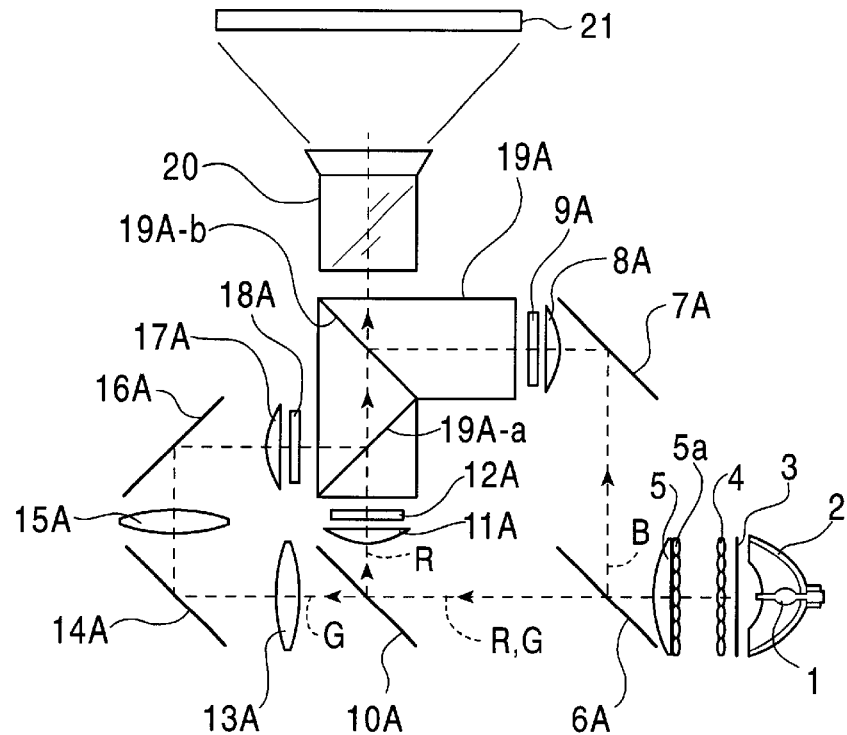
FIG. 3 illustrates a second example of a structure of the projection display device including an embodiment of a projection lens in accordance with the present invention.

FIG. 3 conceptually illustrates a second example of an internal structure of the projector 502 which includes an embodiment of the projection lens 20. In FIG. 3, component parts similar to those shown in FIG. 2 are given the same reference numerals and are not described below.

Here, a dichroic mirror 6A disposed behind a multi-lens array 5 reflects a blue light beam B but transmits a red light beam R and a green light beam G.

The blue light beam B reflected by the dichroic mirror 6A is reflected by a mirror 7A, and, then, passes through a condenser lens 8A in order to be modulated by a blue-light liquid crystal panel block 9A. After being modulated, it is incident upon a light-synthesizing device 19A from the direction illustrated.

The red light beam R and the green light beam G which have passed through the dichroic mirror 6A are incident upon a dichroic mirror 10A disposed behind the dichroic mirror 6A. Here, the dichroic mirror 10A reflects the red light beam R but transmits the green light beam G.

The red light beam R reflected by the dichroic mirror 10A passes through a condenser lens 11A. After being modulated by a red-light liquid crystal panel block 12A, the red light beam R impinges upon the light-synthesizing device 19A from the illustrated direction.

The green light beam G which has passed through the dichroic mirror lOA reaches a condenser lens 17A through a relay lens 13A, a mirror 14A, an inversion relay lens 15A, and a mirror 16A. Then, it passes through the condenser lens 17A. After being modulated by a green-light liquid crystal panel block 18A, the green light beam G impinges upon the light-synthesizing device 19A from the illustrated direction.

The light-synthesizing device 19A is also formed by forming a combination of reflective films 19A-a and 19A-b at a prism having a predetermined shape.

Of the color light beams which have impinged upon the light-synthesizing device 19A, the blue light beam B is reflected by the reflective film 19A-b and is incident upon the projection lens 20, whereas the green light beam G is reflected by the reflective film 19A-a and is incident upon the projection lens 20. The red light beam R passes in a straight line through the light-synthesizing device 19A in order to be incident upon the projection lens 20. As a result, the light beams R, G, and B are synthesized into one light beam, which impinges upon the projection lens 20.

Figure 4:
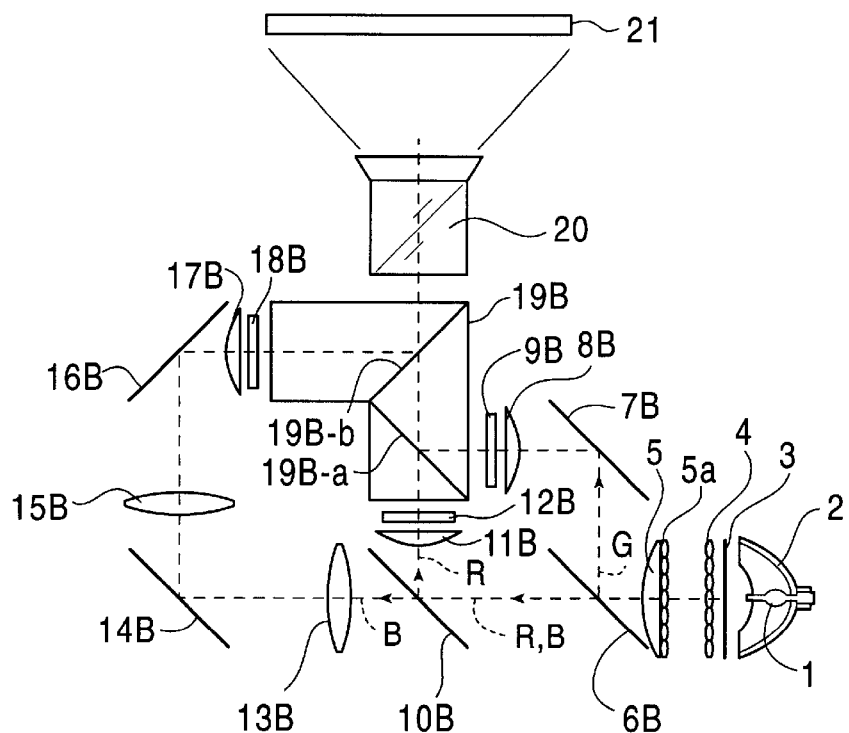
FIG. 4 illustrates a third example of a structure of the projection display device including an embodiment of a projection lens in accordance with the present invention.

1-4. Internal structure of projector (third example) FIG. 4 conceptually illustrates a third example of an internal structure of the projection display device which includes an embodiment of the projection lens. In FIG. 4, component parts similar to those shown in FIGS. 2 and 3 are given the same reference numerals, and are not described below.

Here, a dichroic mirror 6B reflects a green light beam G but transmits a red light beam R and a blue light beam B.

Here, the green light beam G reflected by the dichroic mirror 6B passes through a green-light liquid crystal panel block 9B via a mirror 7B and a condenser lens 8B. Then, it is incident upon a light-synthesizing device 19B from the illustrated direction.

The red light beam R and the blue light beam B which have passed through the dichroic mirror 6B impinge upon a dichroic mirror 10B. The red light beam R is reflected by the dichroic mirror 10B, whereas the blue light beam B is transmitted through the dichroic mirror 10B.

The red light beam R reflected by the dichroic mirror 10B impinges upon the light-synthesizing device 19B from the illustrated direction through a condenser lens 11B and a red-light liquid crystal panel block 12B.

The blue light beam B which has passed through the dichroic mirror 10B successively passes through a relay lens 13B, a mirror 14B, an inversion relay lens 15B, a mirror 16B, a condenser lens 17B, and a blue-light liquid crystal panel block 18B. Then, it impinges upon the light-synthesizing device 19B from the illustrated direction.

The light-synthesizing device 19B is also formed by forming a combination of reflective films 19B-a and 19B-b at a prism having a predetermined shape. Of the light beams which have impinged upon the light-synthesizing device 19B, the green light beam G is reflected by the reflective film 19B-a, while the blue light beam B is reflected by the reflective film 19B-b. The red light beam R passes in a straight line through the light-synthesizing device 19B. This causes the light beams to be synthesized into one light beam, which impinges upon the projection lens 20.

1-5. Internal structure of projector (fourth example)

Figure 5:
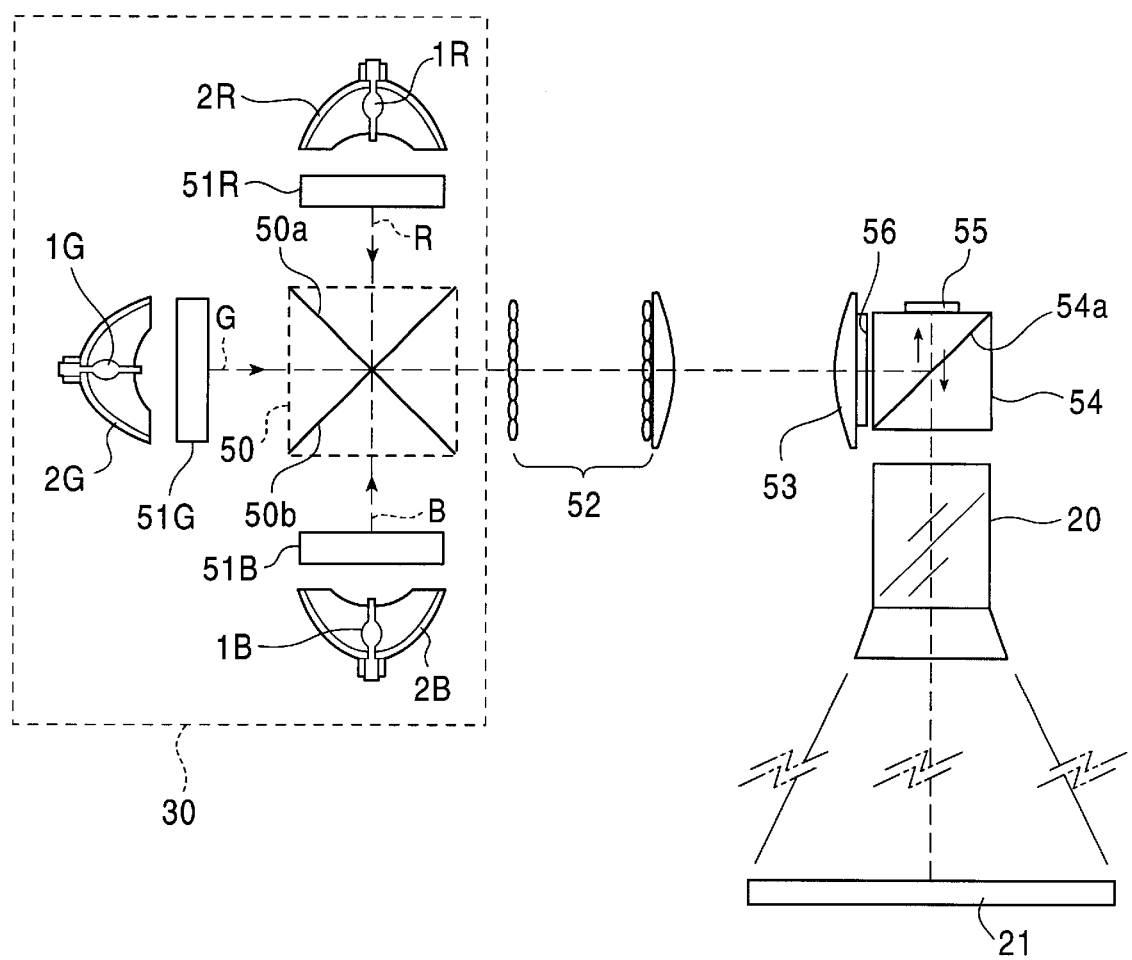
FIG. 5 illustrates a fourth example of a structure of the projection display device including an embodiment of a projection lens in accordance with the present invention.

FIG. 5 illustrates a fourth example of an internal structure of the projection display device including an embodiment of the projection lens. In the fourth example, reflective light valves are used in the structure of the projection display device.

In contrast, in the first to third examples, transmissive light valves are used in the structures of the projection display devices. More specifically, the liquid crystal blocks 9, 12, and 18, the liquid crystal blocks 9A, 12A, and 18A, and the liquid crystal blocks 9B, 12B, and 18B, used to form two-dimensional images as a result of passing incident light therethrough, are provided as transmissive light valves.

In the structure shown in FIG. 5, in a light source/space modulating section 30, a red-light lamp 1R and a red-light reflector 2R, a green-light lamp 1G and a green-light reflector 2G, and a blue-light lamp 1B and a blue-light reflector 2B are disposed in accordance with the positional relationships shown in FIG. 5. Light beams from their corresponding color lamps collimated by their corresponding reflectors exit and pass through corresponding red-light time-division space modulating element 51R, green-light time-division space modulating element 51G, and blue-light time-division space modulating element 51B, so that a red light beam R, a green light beam G, and a blue light beam B impinge upon a dichroic mirror 50.

The red-light time-division space modulating element SiR, the green-light time-division space modulating element 51G, and the blue-light time-division space modulating element 51B operate in accordance with image display operations carried out successively based on red light R, green light G, and blue light B.

More specifically, within, for example, a one-frame period, when the red-light time-division space modulating element 51R is made to pass light, the green-light time-division space modulating element 51G and the blue-light time-division space modulating element 51B are made not to pass light. For example, at a predetermined timing from the aforementioned period, the green-light time-division space modulating element 51G is made to pass light, while the red-light time-division space modulating element 51R and the blue-light time-division space modulating element 51B are made not to pass light. In a next predetermined timing, the modulating elements 51G, 51B, and 51G are controlled so that the blue-light time-division space modulating element 51B passes light, while the red-light time-division space modulating element 51R and the green-light time-division space modulating element 51G do not pass light. Based on such time division, space modulating operations with red light R, green light G, and blue light B are repeated with every one frame, so that the red light beam R, the green light beam G, and the blue light beam B alternately exit from the light source/space modulating section 30 in a certain short cycle.

Due to such operations, the final image projected onto the screen 21 is produced as a result of alternately displaying a red image, a green image, and a blue image within a short cycle. However, to anyone looking at the screen 21, the final image appears as a full color image (an image formed by white light) in which the three colors, red R, green G, and blue B, are synthesized.

Accordingly, the light beams which have exited from their corresponding red-light time-division space modulating element 51R, green-light time-division space modulating element 51G, and blue-light time-division space modulating element 51B are incident upon a dichroic mirror 50. The dichroic mirror 50 comprises dichroic mirrors 50a and 50b disposed in the locations such as those illustrated in FIG. 5.

The red light beam R which has exited from the red-light time-division space modulating element 51R is reflected by the dichroic mirror 50a, and impinges upon an integrator 52. The green light beam G which has exited from the green-light time-division space modulating element 51G passes through the dichroic mirrors 50a and 50b, and impinges upon the integrator 52. The blue light beam B which has exited from the blue-light time-division space modulating element 51B is reflected by the dichroic mirror 50b, and impinges upon the integrator 52.

The integrator 52 corresponds to the multi-lens arrays 4 and 5 shown in FIGS. 2 to 4. The light beams R, G, and B (that is, white light) incident upon the integrator 52 are separated by each of the lenses of the integrator 52. The separated light beams are refracted by a condenser lens 53 towards a light valve 55.

A polarizer 56 is provided behind the condenser lens 53. The polarizer 56 transmits only light beams whose oscillation directions are the same as that of an s-polarized light beam. These s-polarized light beams are incident upon a polarization beam splitter 54. Here, all of the s-polarized light beams illuminate the light valve 55 so as to be superimposed thereupon.

In addition to the method using the polarizer 56, a method using a polarization conversion means using a PBS (polarization beam splitter) and a 1/2 wavelength plate in order to produce only s-polarized light beams without absorbing p-polarized light beams may also be used.

The light beam incident upon the polarization beam splitter 54 is reflected by a PBS coated surface of the polarization beam splitter 54, and illuminates the light valve 55.

At the light valve 55, a two-dimensional image is formed by an image signal, and the incident light is reflected as image light converted into a p-polarized image light. The image light enters the polarization beam splitter 54 again, passes through the coated surface, and is projected in enlarged form onto a screen 21 by a projection lens 20.

Figure 6:
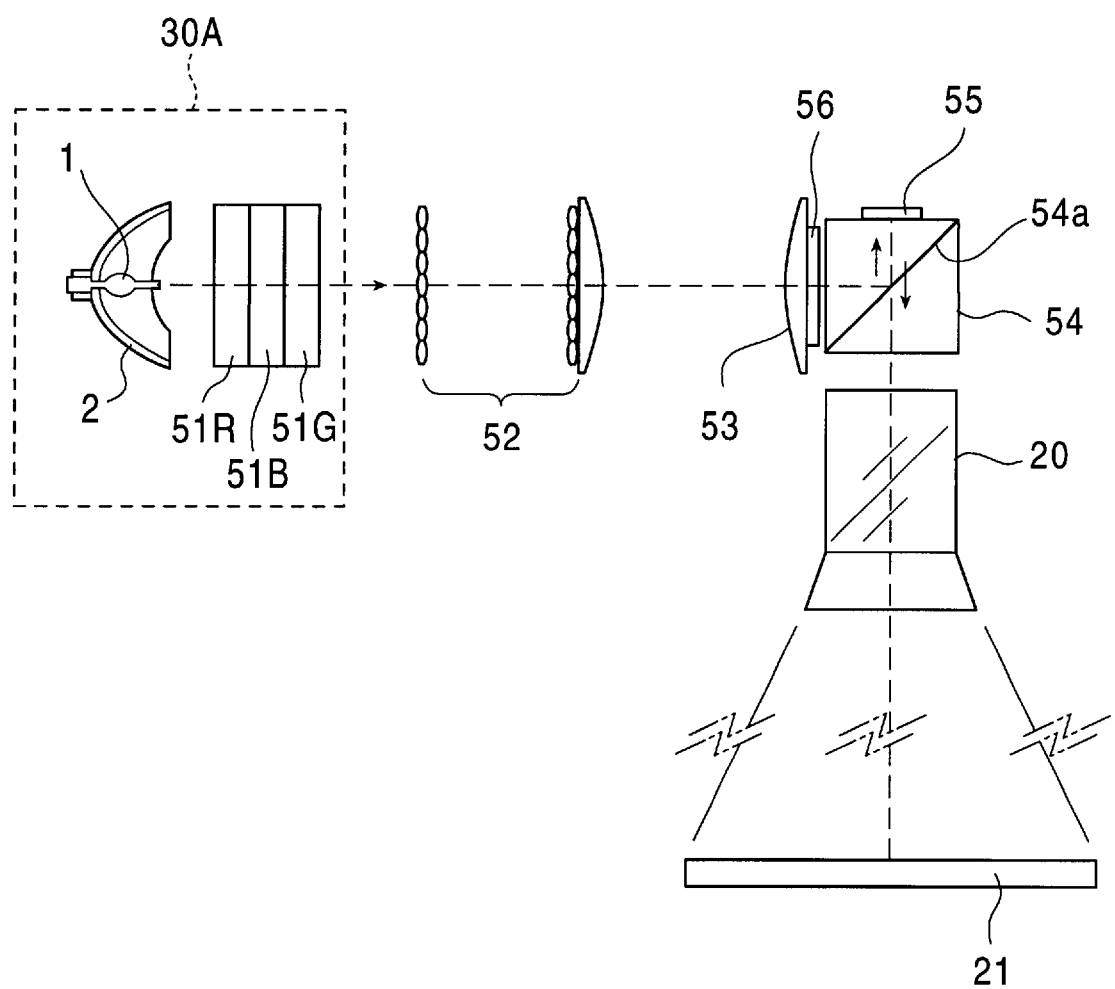
FIG. 6 illustrates a modification of the fourth example of the structure of the projection display device including an embodiment of a projection lens in accordance with the present invention.

FIG. 6 illustrates a modification of the fourth example of the internal structure of the projection display device.

In the structure shown in FIG. 6, a light source/space modulating section 30B is provided in place of the light source/space modulating section 30 of the structure shown in FIG. 5. In FIG. 6, component parts similar to those shown in FIG. 5 are given the same reference numerals, and are not described below.

In the light source/space modulating section 30B shown in FIG. 6, light from a lamp 1 collimated by a reflector 2 exits towards a red-light time-division space modulating element 51R, a blue-light time-division space modulating element 51B, and a green-light time-division space modulating element 51G. The three modulating elements 51R, 51B, and 51G are disposed so as to be placed upon each other. The exiting light is incident upon an integrator 52.

In this structure, the transmission and the non-transmission timings of light in relation to the red-light time-division space modulating element 51R, the green-light time-division space modulating element 51G, a nd the blue-light time-division space modulating element 51B are also controlled in accordance with image display operations carried out successively based on red light R, blue light B, and green light G. Therefore, in this case, a red light beam R, a green light beam G, and a blue light beam B alternately exit from the light source/space modulating section 30B.

Figure 7B:
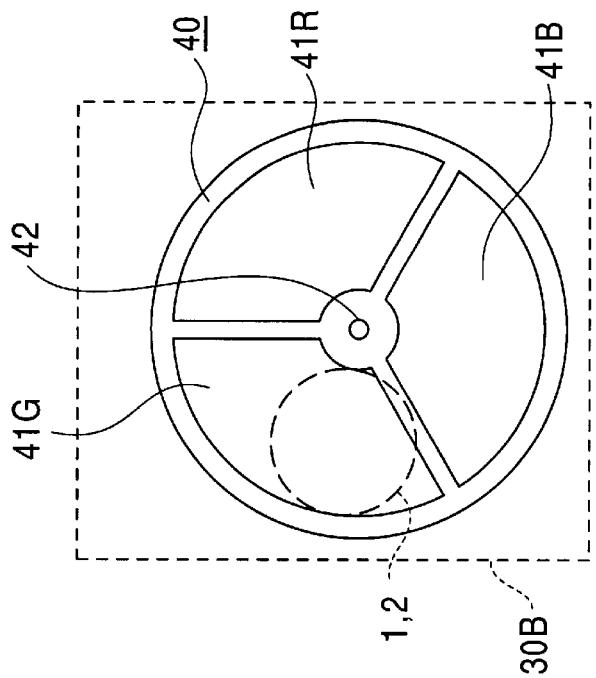
FIGS. 7A and 7B illustrate another modification of the fourth example of the structure of the projection display device including an embodiment of a projection lens in accordance with the present invention.
Figure 7A:
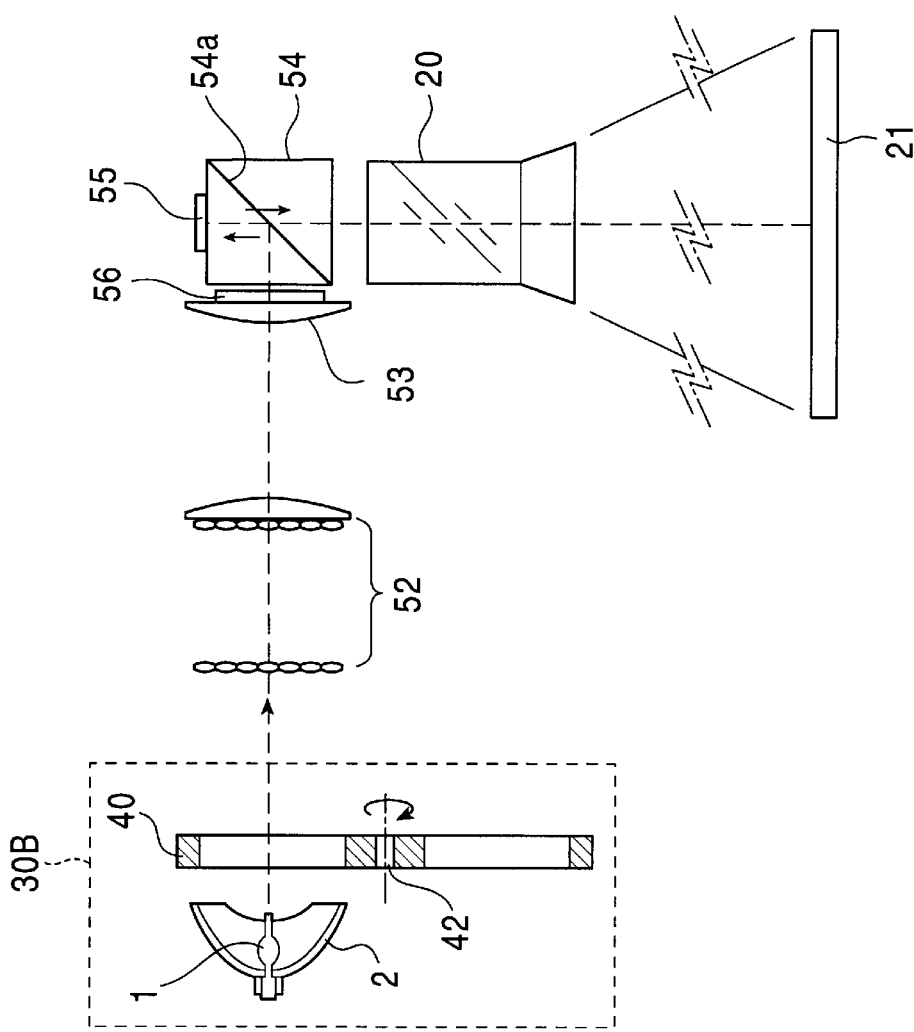

FIGS. 7A and 7B illustrate another modification of the internal structure of the projection display device. In the projection display device shown in FIG. 7A, a light source/space modulating section 30C is used in place of the light source/space modulating section 30 of the structure shown in FIG. 5. In FIGS. 7A and 7B, component parts corresponding to those shown in FIG. 5 are given the same reference numerals, and are not described below.

The light source/space modulating section 30C shown in FIG. 7A comprises a lamp 1, a reflector 2, and a time-division space modulating disk 40. Light from the lamp 1 collimated by the reflector 2 passes through the time-division space modulating disk 40, and, then, impinges upon an integrator 52.

FIG. 7B illustrates a front view of the time-division, space modulating disk 40.

As can be seen from FIG. 7B, a red dichroic filter 41R for transmitting a red light component, a blue dichroic filter 41B for transmitting a blue light component, and a green dichroic filter 41G for transmitting a green light component are provided at the time-division space modulating disk 40 so as to have, for example, the illustrated forms.

The time-division space modulating disk 40 is mounted inside the projection display device so as to rotate around a rotary shaft 42 as a center. Its location in relation to the light source comprising the lamp 1 and the reflector 2 is defined so that the ranges of the light beams from the light source represented by broken lines in FIG. 7B are covered by the color dichroic filters 41R, 41B, and 41G.

In this structure, by rotating the time-division space modulating disk 40 at a predetermined rotational period and in a fixed direction, the light beams from the light source section are transmitted through the time-division space modulating disk 40 as a red light beam R, a green light beam G, and a blue light beam B based on time division. In other words, in accordance with the display operations which are successively carried out, the red light beam R, the green light beam G, and the blue light B alternately exit from the time-division space modulating disk 40 in a short cycle.

The transmissive light valves (that is, liquid crystal panel blocks) used in the first-example to third-example structures described above may be, for example, STN (super twisted nematic) liquid crystal display devices, ferroelectric liquid crystal display devices, or polymer dispersed liquid crystal display devices. Driving methods include the passive matrix display driving method and the active matrix driving method.

The reflective light valves used in the fourth-example structure may be reflective liquid crystal devices which comprise either a driving electrode or a driving active element provided on a glass substrate or a silicone substrate, in which TN (twisted nematic) mode liquid crystals, ferroelectric liquid crystals, or polymer dispersed liquid crystals are driven. In addition, reflective liquid crystal devices in which a voltage is applied to the liquid crystals as a result of illuminating the liquid crystals with light through a photoconductive film may also be used. Further, reflective liquid crystal devices such as grating light valves having a structure which changes the shape or state of an electrical field may be used.

Although the embodiment of the projector has been described by illustrating four examples and two modifications of the fourth example, these are strictly speaking examples. Therefore, the projection display device which can include an embodiment of a projection lens of the present invention may have various other internal structures.

2. Lens

What is called a retrofocus lens system is used for projection lenses 20 of embodiments of the present invention described below. Here, the principles of a retro-focus lens is described in a simple manner with reference to FIGS. 8A to 8D and FIGS. 9A and 9B.

Figure 8A:
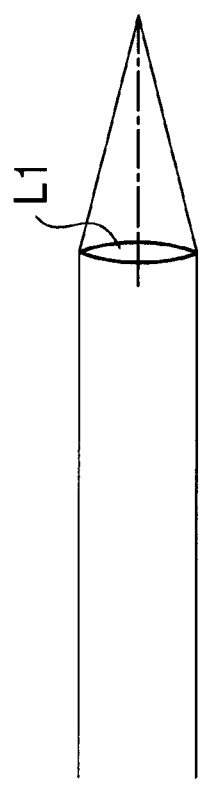
FIGS. 8A–D illustrates the principles of a retrofocus lens.

A lens L1 shown in FIG. 8A has a positive refractive power. FIG. 8A shows that, in the ordinary lens L1 having a positive refractive power, the focus is situated at distance corresponding to a short conjugate-side focal length from a principal point when the object is at infinity.

Figure 8B:
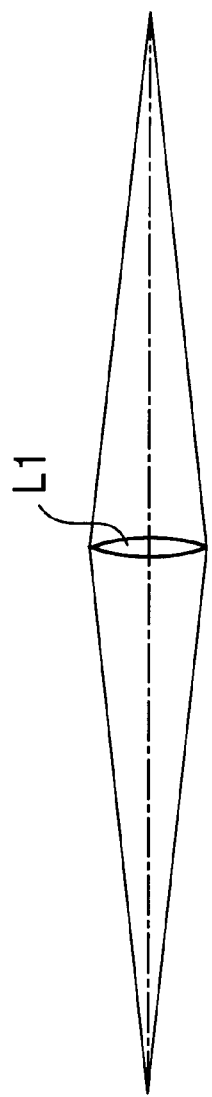

In contrast to this, FIG. 8B shows that the distance of the location of the focus increases when the object point is located nearby.

Figure 8C:
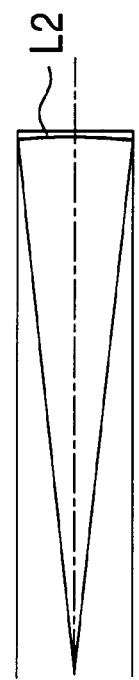

A lens L2 shown in FIG. 8C has a negative refractive power. FIG. 8C shows that, in the lens L2 having a negative refractive power, the focus is situated at a distance corresponding to a long conjugate-side focal length from a principal point when the object is at infinity.

Figure 8D:
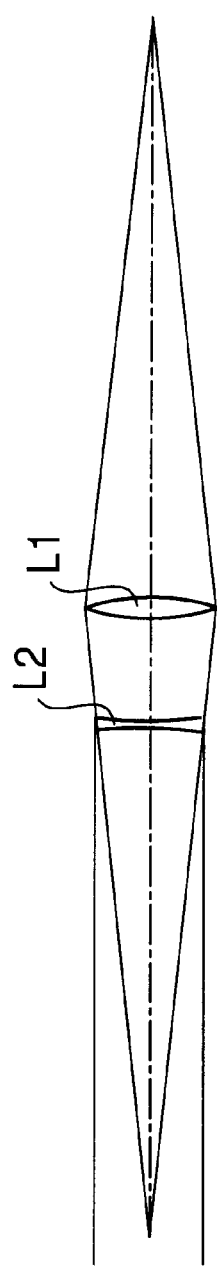

As shown in FIG. 8D, when the lens L1 having a positive refractive power and the above-described property and the lens L2 having a negative refractive power are used in combination, a retrofocus type lens system can be formed.

In the retrofocus type lens system, an image is temporarily formed at a close distance at a long conjugate side by the lens L2 (which can be thought of as a lens group) which is disposed at the front side and has a negative refractive power. Since the location of the image is the object point for the lens L1 (which can also be thought of as a lens group) which is disposed behind the lens L2 and has a positive refractive power, a long back focus can be obtained.

Figure 9A:
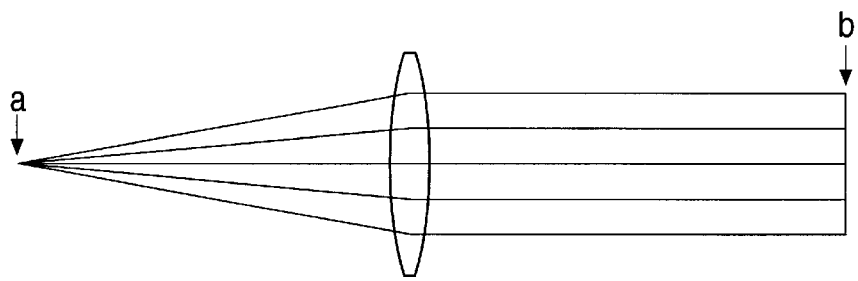
Figure 9B:
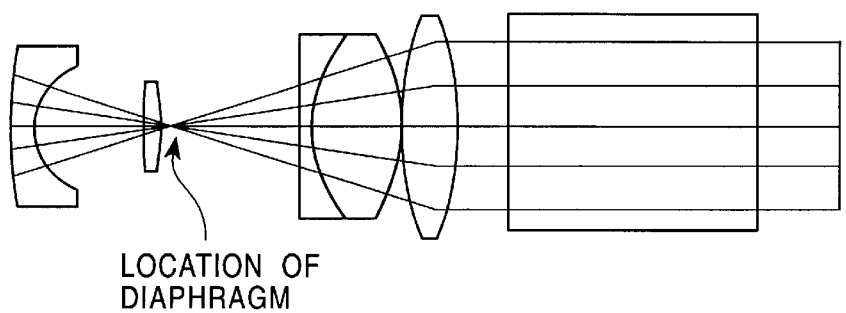

FIGS. 9A and 9B illustrate the relationship between the location of a diaphragm and the telecentric property in relation to a principal ray in the retrofocus type lens system.

As shown in FIG. 9A, when the object is at infinity, parallel light beams enter the lens and converge at the focal point. In contrast, when the object point is situated at the focal point, parallel rays exit from the lens.

Here, as shown in FIG. 9B, the principle ray is defined as a light beam which passes through the center of the diaphragm. Under this condition, when the diaphragm is disposed at the location of the front focal point of a lens group disposed behind the diaphragm, the exiting light beams become parallel light beams, so that the telecentric property in relation to the principal ray can be realized.

The following can be said about the focusing in the retrofocus-type lens system.

Figure 10A:
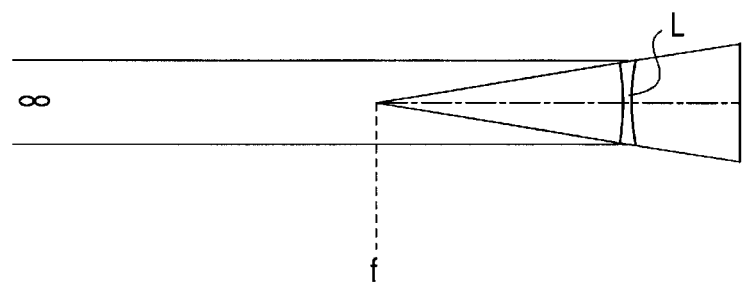
Figure 10B:
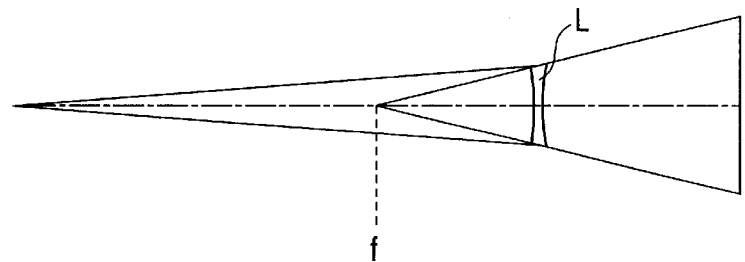

As shown in FIG. 10A, when the object is moved from infinity to a close distance, the back focus of the lens system becomes long. In this case, as shown in FIG. 10B, the whole lens is moved to a certain location to perform a focusing operation. In the application, this type of focusing method is called a "total drawing-out method."

Here, in the retrofocus type lens system, the image of the front lens (the front lens group) having a negative refractive power is located at a close distance when the object point is located at a close distance. Therefore, the back focus of the back lens (the back lens group) becomes longer. Here, by placing the image of the front lens (lens group) viewed from the back lens (lens group) at a fixed location at all times, the back focus of the entire lens system can be fixed.

Here, in the case where a plurality of lens subgroups are disposed in the front lens group, when the projection distance is changed, a gap between lens subgroups in the front lens group is varied in order to fix the location of the image of the front lens group, making it possible to perform a focusing operation without moving the back focus of the entire lens system.

In the embodiments of the projection lenses described below, this principle is applied. In other words, in the whole lens system, instead of using the total drawing-out method to perform a focusing operation, a gap between lens subgroups in the front lens group is varied to perform the focusing operation.

In the method of varying a gap between lens subgroups, for example, when a gap in a lens group at one location in the entire lens system is varied within the size range of a screen, a gap between lens subgroups in the front lens group of the whole lens system is varied. This makes it possible to perform a focusing operation at the same time, so that the locations of the whole lens system and the light valves do not change. In addition, since a focusing mechanism is provided at the front side of the whole lens system, the lens holding mechanism is simplified, thereby simplifying the task of actually assembling the projection lens and making adjustments.

In the embodiment of each projection lens, as described below, an aspherical lens having a required aspherical shape is disposed in the structure of the front lens group (that is, a first lens group) and the back lens group (that is, a second lens group). Here, the conditions for using a lens having an aspherical surface are described in a simple manner.

When an aspherical lens is used as a negative lens in the front lens group, it is shaped so that the negative refractive power becomes weaker as the distance from the optical axis increases.

When an aspherical lens is used as a positive lens in the back lens group, it is shaped so that the positive refractive power becomes weaker as the distance from the optical axis increases. In contrast, when an aspherical lens is used as a negative lens in the back lens group, it is shaped so that the negative refractive power becomes weaker as the distance from the optical axis increases.

Here, it is preferable that a surface at a large height from the optical axis of an abaxial light flux be formed into an aspherical surface of an aspherical lens. This decreases the amount of overlapping of light flux producing images having different heights, abaxial aberrations such as astigmatism and distortion are effectively corrected. When aspherical surfaces are used for surfaces which axially or abaxially overlap each other, spherical aberration and coma are effectively corrected.

3. Lens Configurations 3-1. Configurations of lens elements

Next, the lens configurations of the projection lenses of the embodiments will be described with reference to FIGS. 11 to 15. Projection lenses of a first embodiment to a fifth embodiment described below are used as the projection lenses 20 in the projection display devices previously illustrated in FIGS. 2 to 7.

Here, the descriptions are confined primarily to the configurations of the lenses in the first to fifth embodiments, so that the shape of each lens, the distances between the lenses, and the like are shown in the corresponding numerical examples described after the descriptions of the configurations of the lenses. In FIGS. 11 to 15 described below, reference numerals r1 to r15 (r13) represent lens surface numbers, whereas reference numerals d1 to d14 (d12) represent gaps between surfaces and lens gaps (that is, lens thicknesses) on the optical axis. Reference numerals L1 to L6 (L5) placed beside the lenses are lens numbers, which are given starting from the lens disposed at the long conjugate side to the lens disposed at the short conjugate side in that order.

First, the configuration of the lenses of the first embodiment of the projection 20 will be given.

Figure 11:
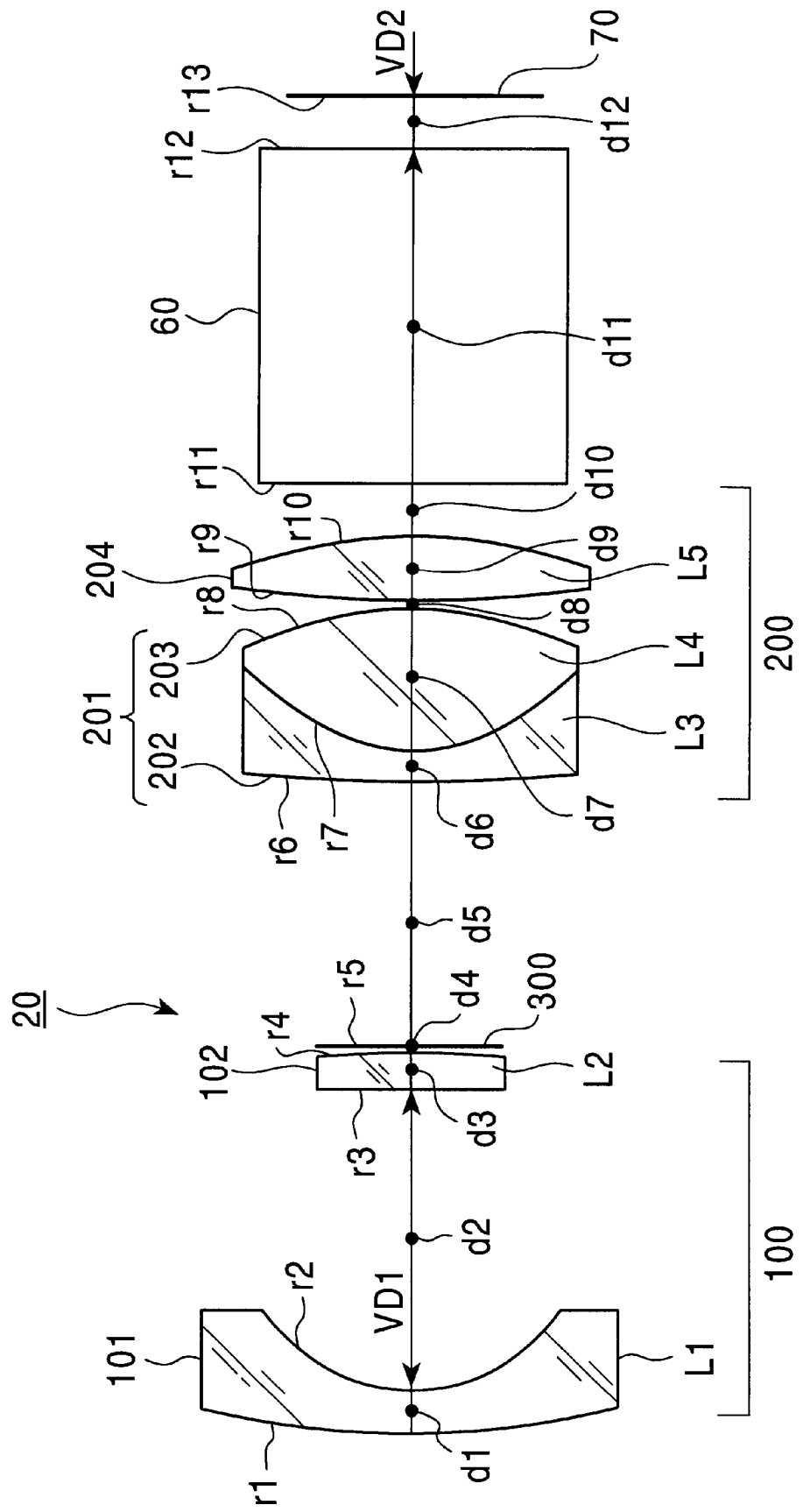
FIG. 11 is a sectional view of the structure of a first embodiment of the projection lens.

FIG. 11 is a sectional view conceptually showing the configuration of the lenses of the first embodiment of the projection lens 20. In the FIGS. 11 to 15, the left side corresponds to the screen 21 side (that is, the long conjugate side), whereas the right side corresponds to the light-valve and light-synthesizing-element side (that is, the short conjugate side). A light-synthesizing element 60 conceptually represents, for example, each of the light-synthesizing elements 19, 19A, and 19B shown in FIGS. 2 to 4 and the polarization beam splitters 54 shown in FIGS. 5 to 7. A light valve 70 conceptually represents the light valves shown in FIGS. 2 to 7 (or the R, G, and B liquid crystal display panel blocks shown in FIGS. 2 to 4).

The first embodiment of the projection lens 20 comprises a first lens group 100, a diaphragm 300, and a second lens group 200, which are disposed in that order from the long conjugate side to the short conjugate side as shown in FIG. 11.

Here, the first lens group 100 comprises an aspherical lens 101 and a positive lens 102, which are disposed in that order from the long conjugate side to the short conjugate side, so that the first lens group 100 as a whole has a positive refractive power.

Here, both surfaces of the aspherical lens 101 formed as a meniscus lens disposed at the longest conjugate side are aspherical surfaces formed in accordance with aspherical factors in the corresponding numerical examples shown below. The aspherical lens 101 is formed so that its negative refractive power becomes stronger from the optical axis center to the vicinity thereof. As can be seen from the numerical examples shown below, the positive lens 102 is disposed so as to contact the diaphragm 300.

The second lens group 200 comprises two lens subgroups including three lenses in all, a combined lens 201 and an aspherical lens 204, which are disposed in that order from the long conjugate side to the short conjugate side.

The combined lens 201 comprises a meniscus lens 202 having a negative refractive power and a positive lens 203 having a positive refractive power. These lenses 202 and 203 are disposed in that order from the long conjugate side to the short conjugate side and bonded together. By virtue of this structure, the second lens group 200 as a whole has a positive refractive power. The aspherical lens 204 in the second lens group 200 has an aspherical factor in accordance with the corresponding numerical examples shown later.

The longest gap in the whole projection lens 20 is disposed in the first lens group. In other words, the longest lens gap in the whole lens system corresponds to an axial air gap equal to d2 between the aspherical lens 101 and the positive lens 102. This also applies to the following second and third embodiments of the projection lenses.

In the specification, in order to specify lens surfaces in a lens group, the terms "last lens surface" and "first lens surface" are sometimes used. The last lens surface refers to the lens surface closest to the short conjugate side in that lens group, while the first lens surface refers to the lens surface closest the longest conjugate side in that lens group. For example, in the first lens group 100 shown in FIG. 11, the last lens surface of the first lens group 100 is the lens surface r4 at the short conjugate side of the positive lens 102, whereas the last lens surface of the first lens group 100 is the lens surface r1 at the long conjugate side of the aspherical lens 101.

Figure 12:
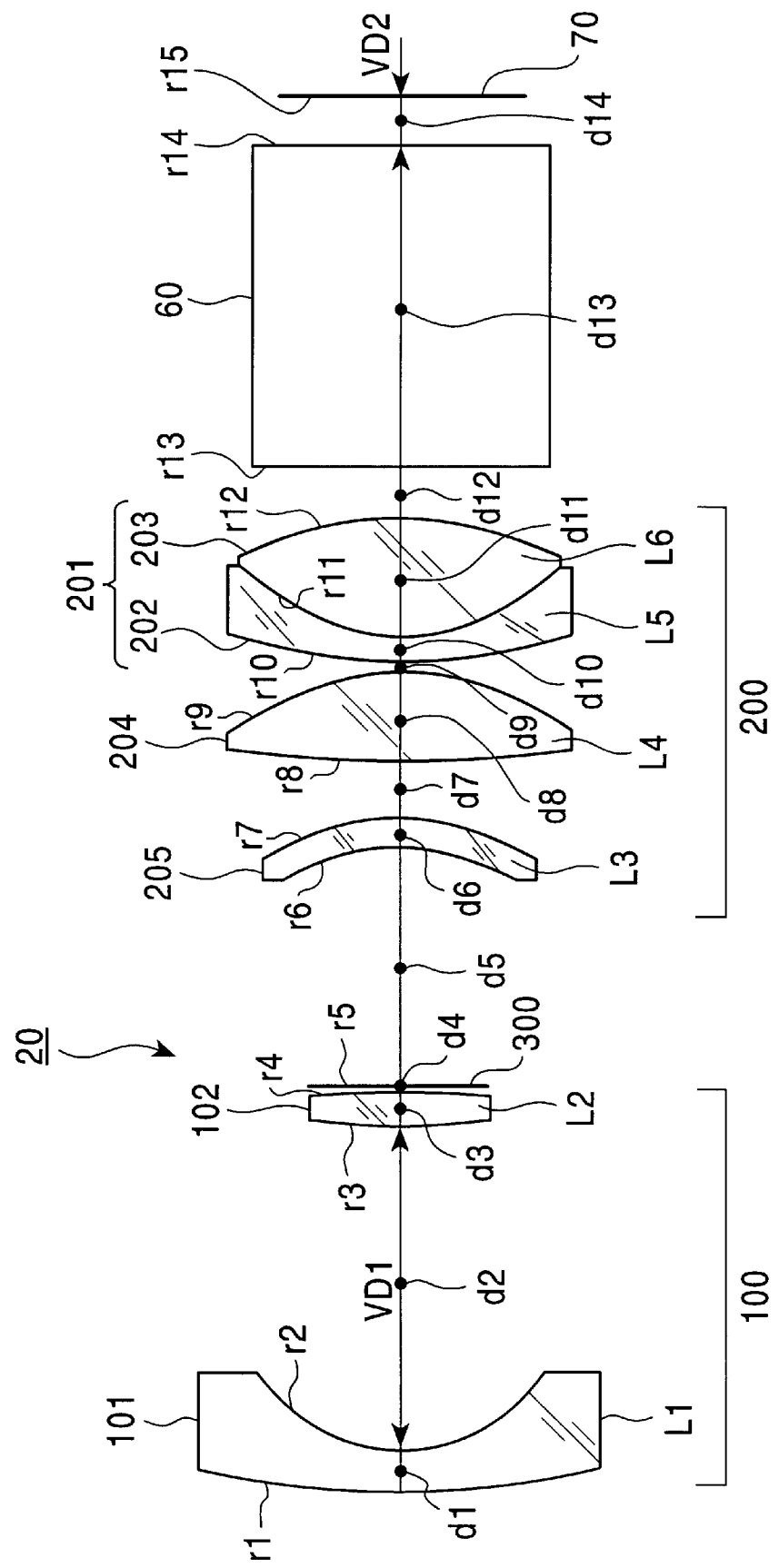
FIG. 12 is a sectional view of the structure of a second embodiment of the projection lens.

FIG. 12 is a sectional view illustrating the configuration of the lenses of the second embodiment of the projection lens 20. In FIG. 12, corresponding component parts to those of FIG. 11 are given the same reference numerals, and descriptions thereof are not given if they are the same as those of the corresponding component parts shown in FIG. 11.

The second embodiment of the projection lens 20 shown in FIG. 12 comprises a second lens group 200 which includes three lens subgroups including four lenses in all, an aspherical lens 205, a positive lens 204, and a combined lens 201, which are disposed in that order from the long conjugate side to the short conjugate side. The second lens group 200 also has as a whole a positive refractive power.

Here, both surfaces of the aspherical lens 205 disposed in the second lens group 200 have convex shapes at the short conjugate side.

Figure 13:
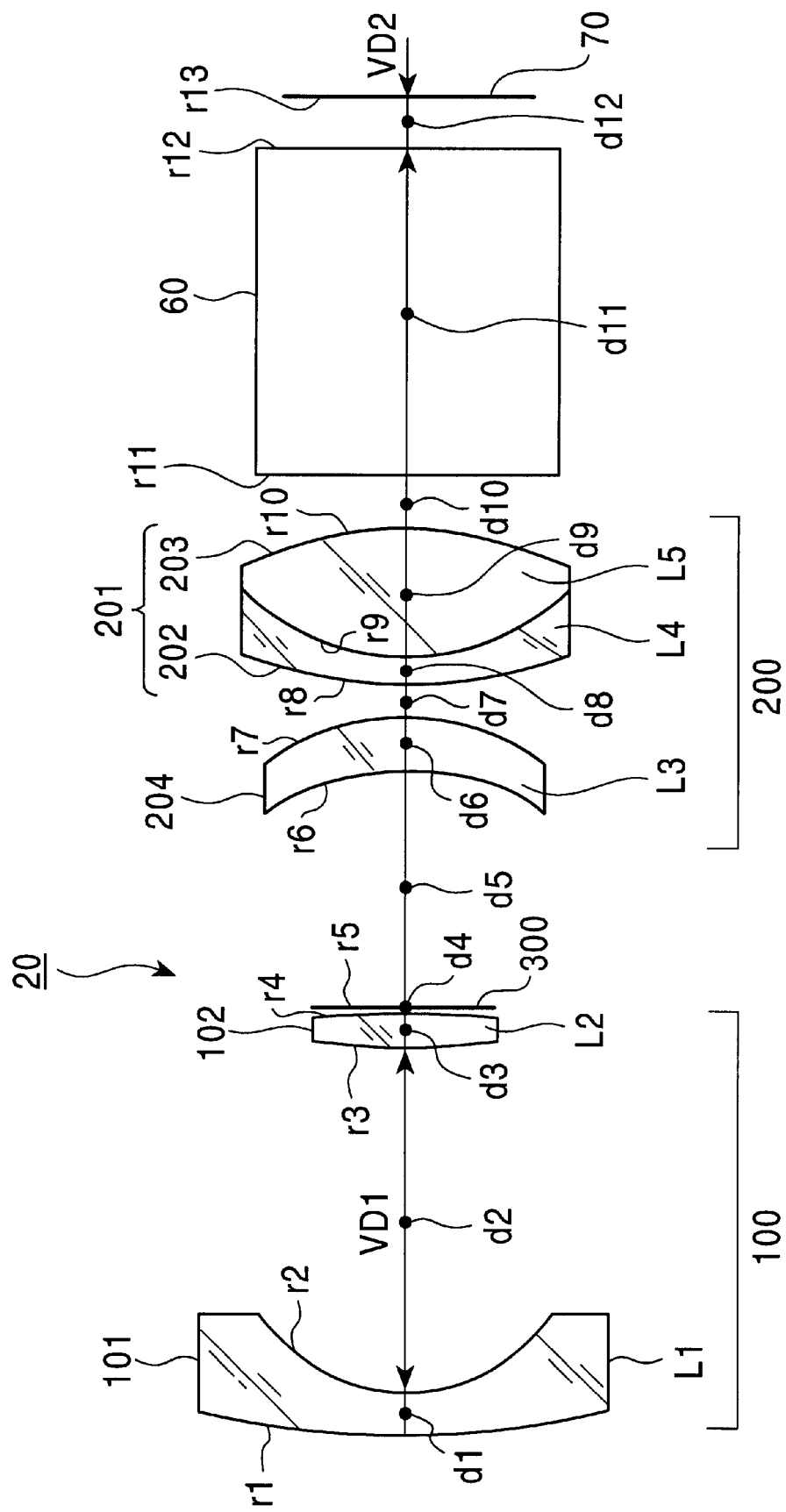
FIG. 13 is a sectional view of the structure of a third embodiment of the projection lens.

FIG. 13 is a sectional view illustrating the configuration of the lenses of the third embodiment of the projection lens 20. The configuration of the lenses in the third embodiment of the projection lens 20 shown in FIG. 13 is similar to that in the second embodiment of the projection lens 20 shown in FIG. 12. Corresponding structural parts are given the same reference numerals, and descriptions thereof are not given below.

Here, as can be seen from corresponding numerical examples described below, a positive lens 102 and a diaphragm 300 are not in contact with each other. Instead, they are disposed close together with a predetermined axial air gap disposed therebetween. This is also true of the projection lenses 20 in the fourth and fifth embodiments described below.

Figure 14:
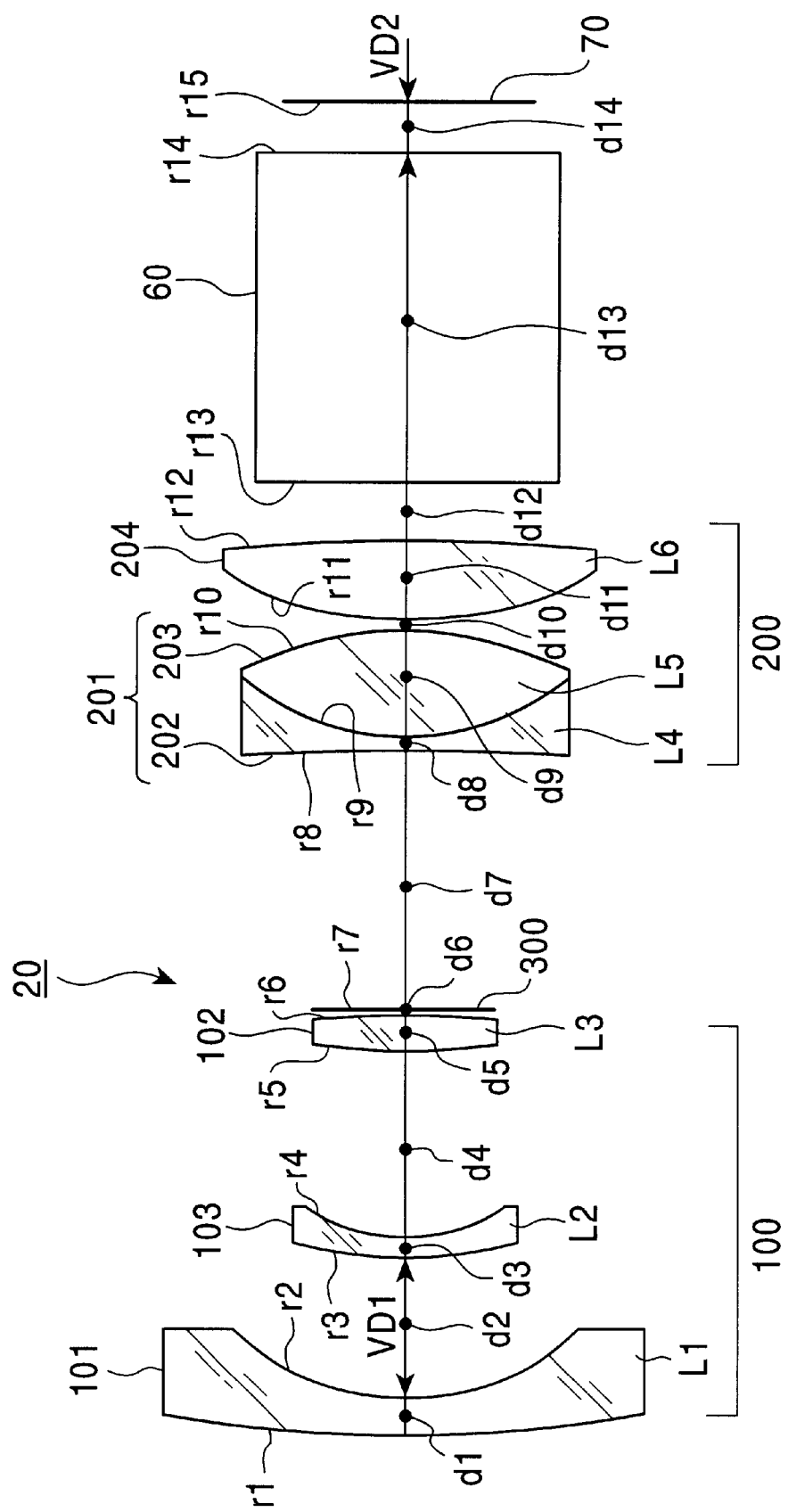
FIG. 14 is a sectional view of the structure of a fourth embodiment of the projection lens.

FIG. 14 is a sectional view illustrating the configuration of the lenses of the fourth embodiment of the projection lens 20. Corresponding parts to those in FIGS. 11 to 13 are given the same reference numerals, and are not described below.

The projection lens 20 of the fourth embodiment shown in FIG. 14 comprises a first lens group. The first lens group comprises three lens subgroups including a total of three lenses, an aspherical lens 101, a meniscus lens 103 having a negative refractive power, and a positive lens 102, which are disposed in that order from the long conjugate side to the short conjugate side. The first lens group has as a whole a positive refractive power.

The configuration of the lenses of a second lens group 200 is similar to the configurations of the lenses of the second lens group 200 used in the first embodiment shown in FIG. 11, so that it will not be described below.

Figure 15:
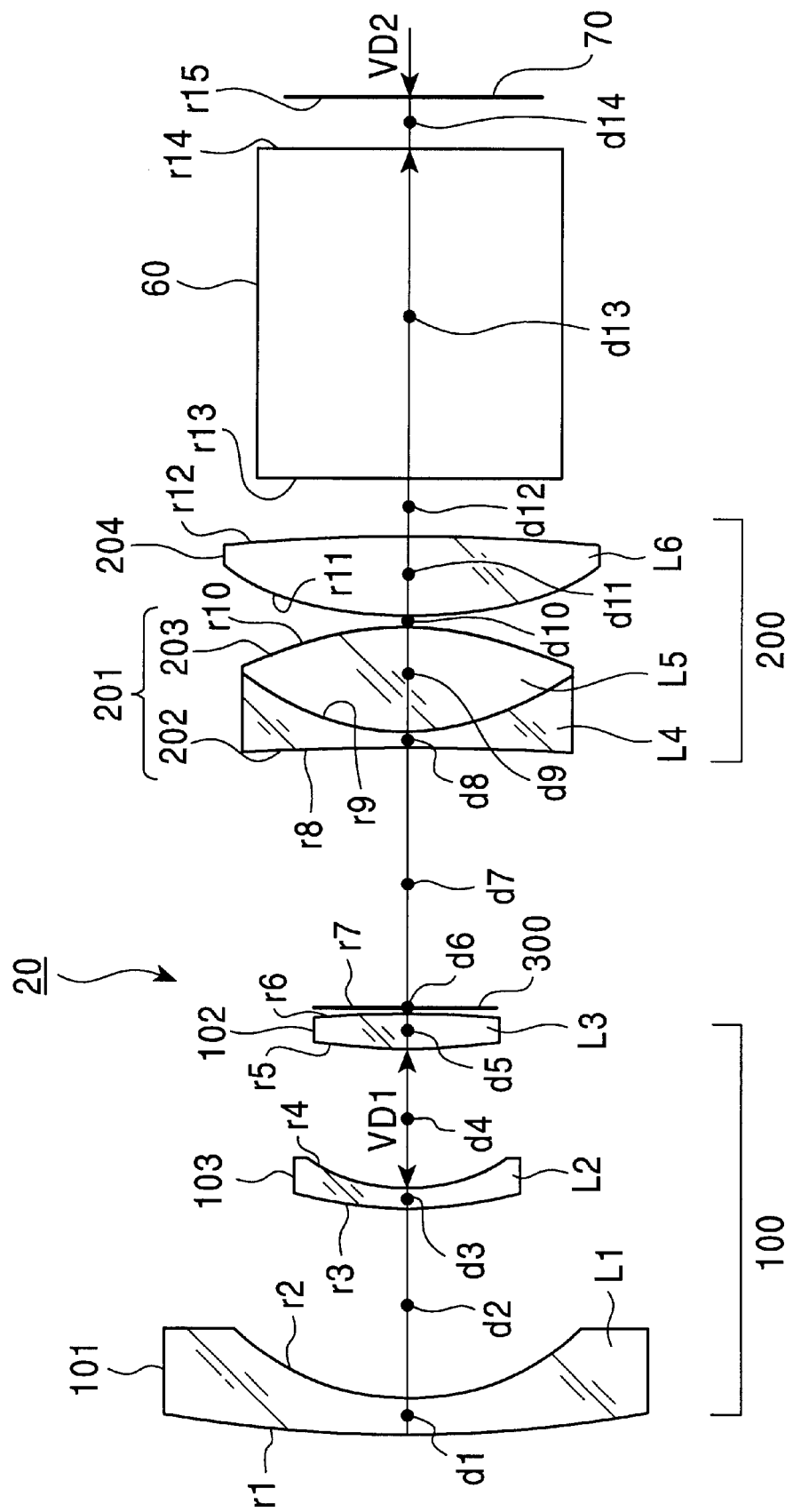
FIG. 15 is a sectional view of the structure of a fifth embodiment of the projection lens.
Figure 21:
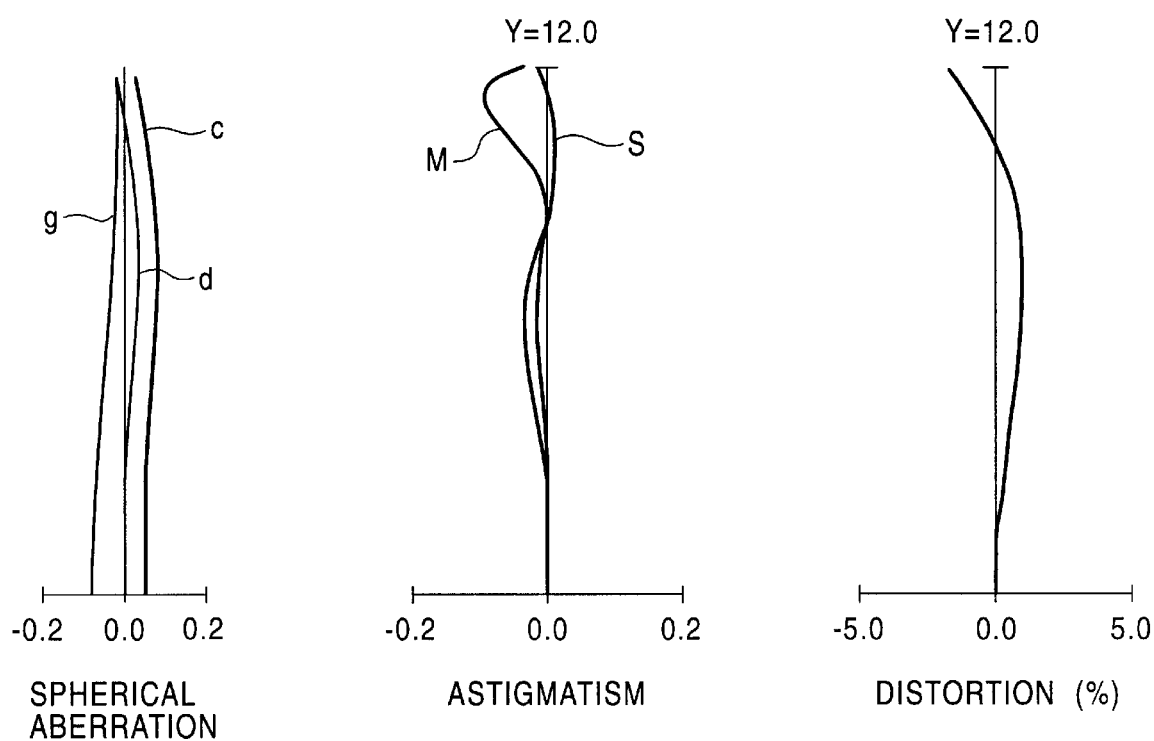
FIG. 21 illustrates spherical aberration, astigmatism, and distortion of the first embodiment of the projection lens.
Figure 22:
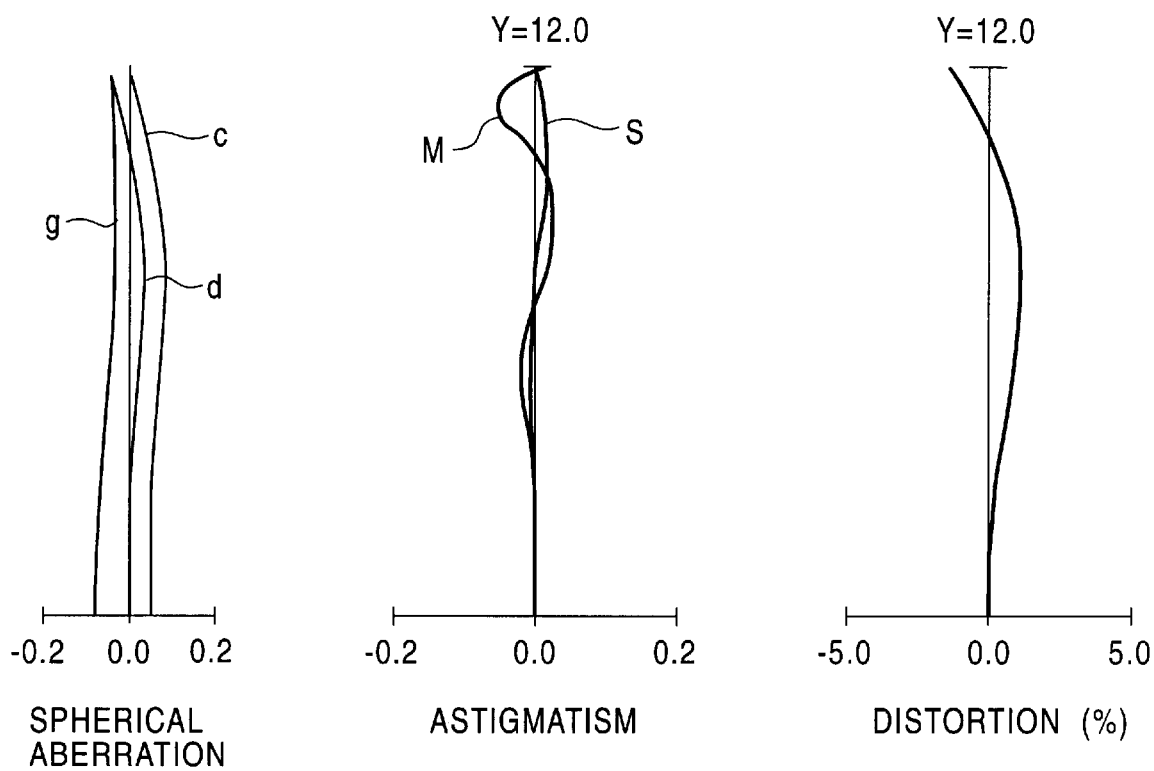
FIG. 22 illustrates spherical aberration, astigmatism, and distortion of the first embodiment of the projection lens.
Figure 23:
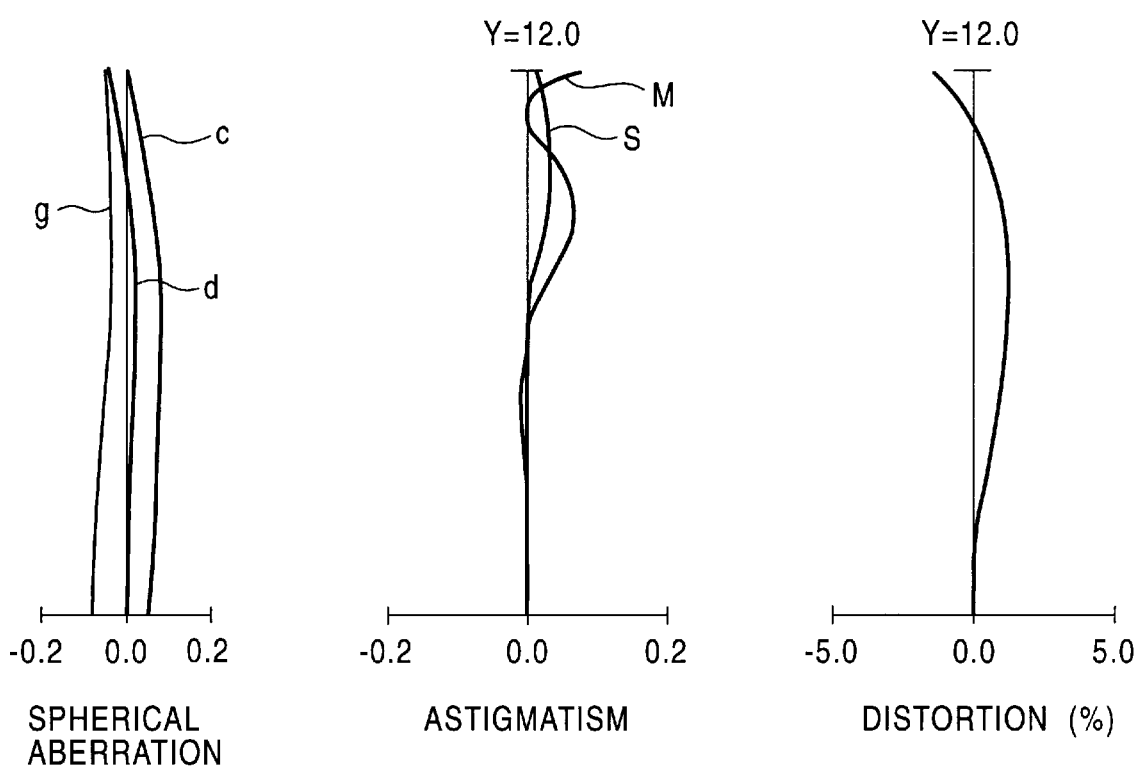
FIG. 23 illustrates spherical aberration, astigmatism, and distortion of the first embodiment of the projection lens.
Figure 24:
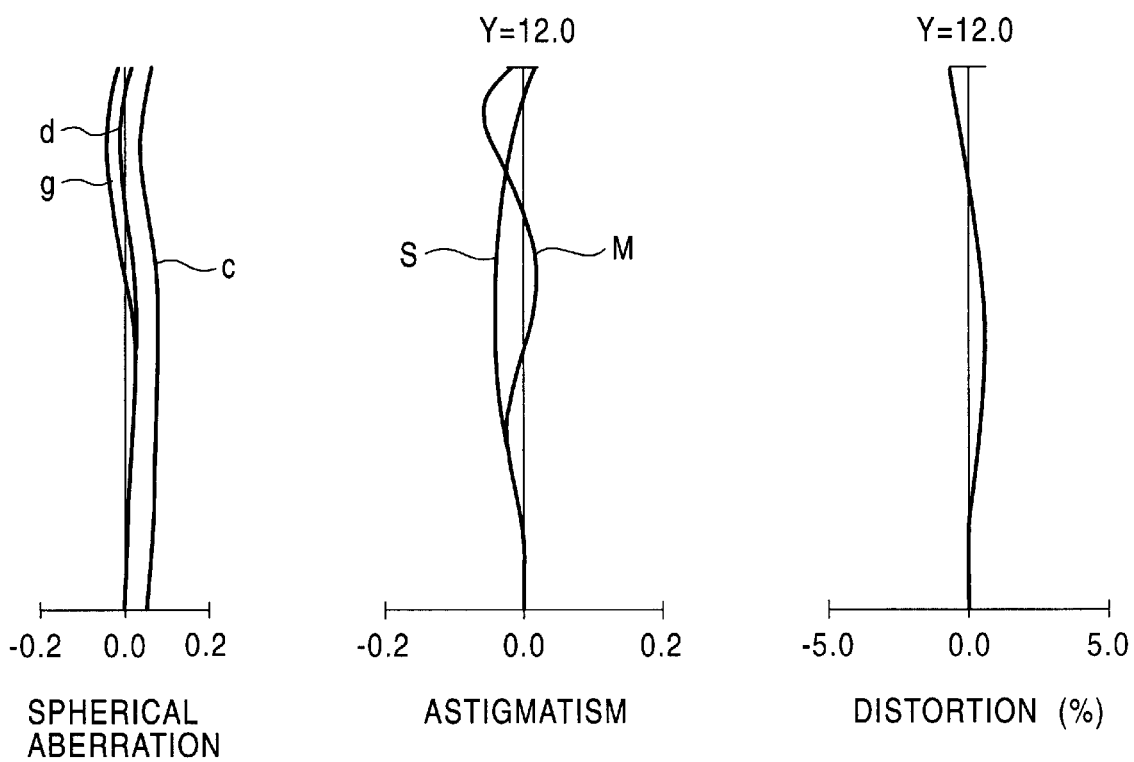
FIG. 24 illustrates spherical aberration, astigmatism, and distortion of the second embodiment of the projection lens.
Figure 25:
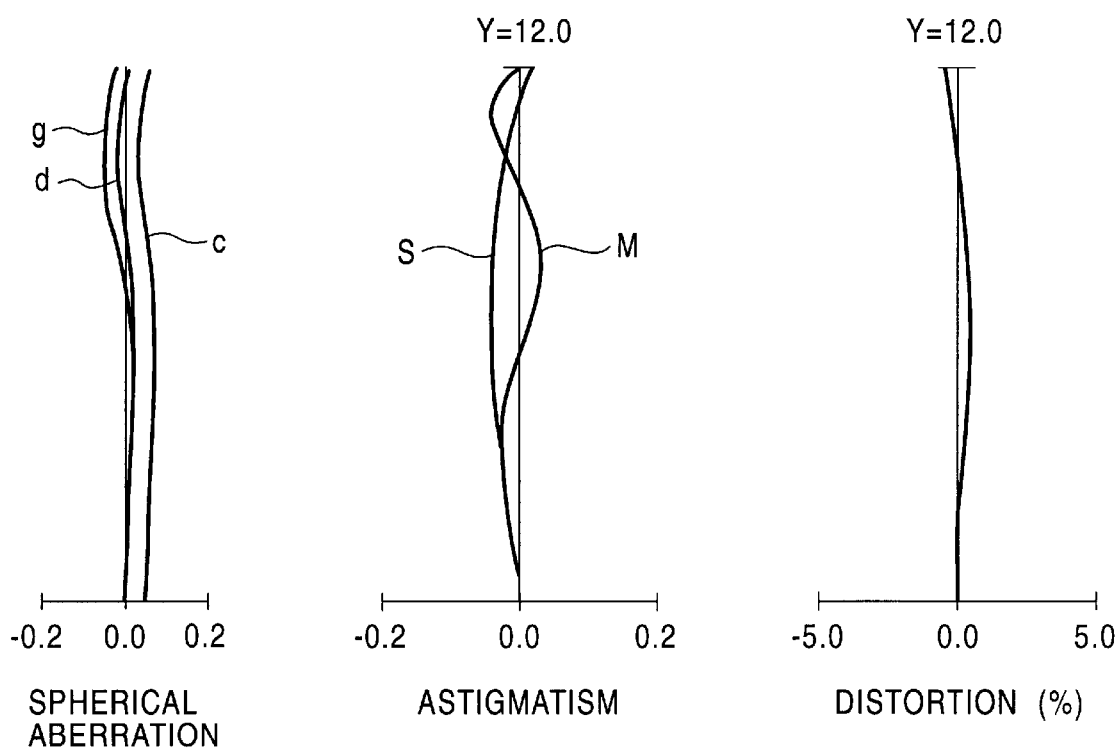
FIG. 25 illustrates spherical aberration, astigmatism, and distortion of the second embodiment of the projection lens.
Figure 26:
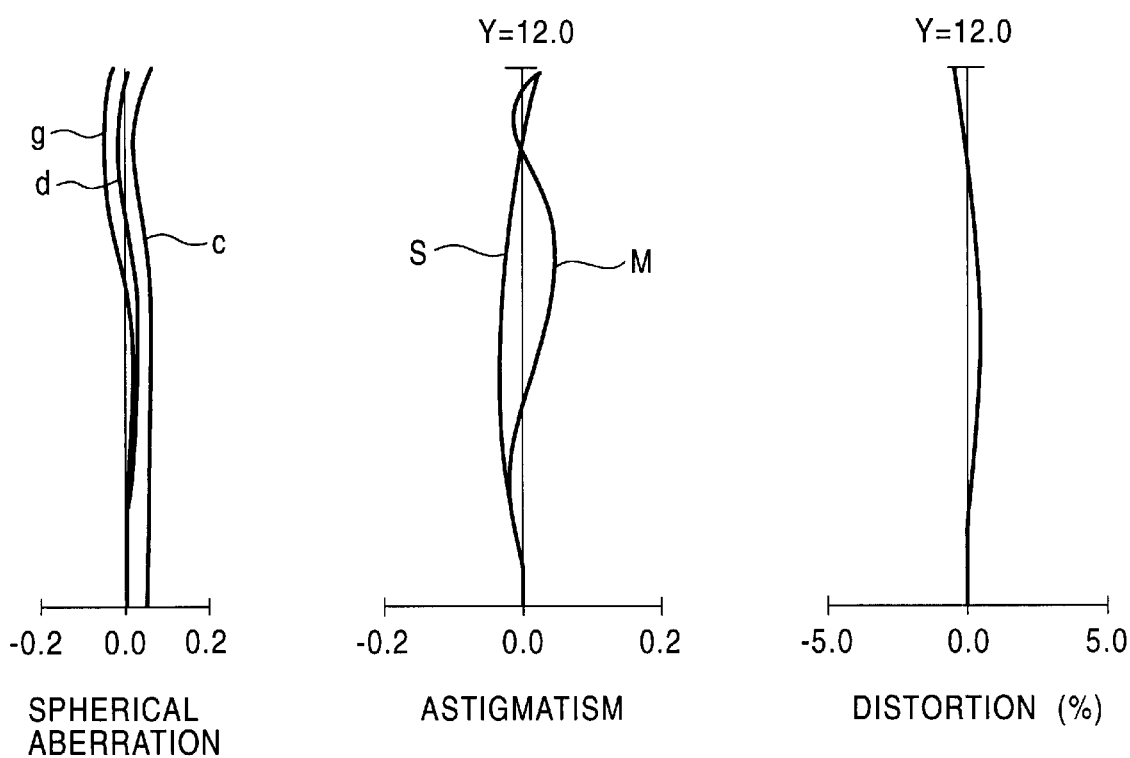
FIG. 26 illustrates spherical aberration, astigmatism, and distortion of the second embodiment of the projection lens.
Figure 27:
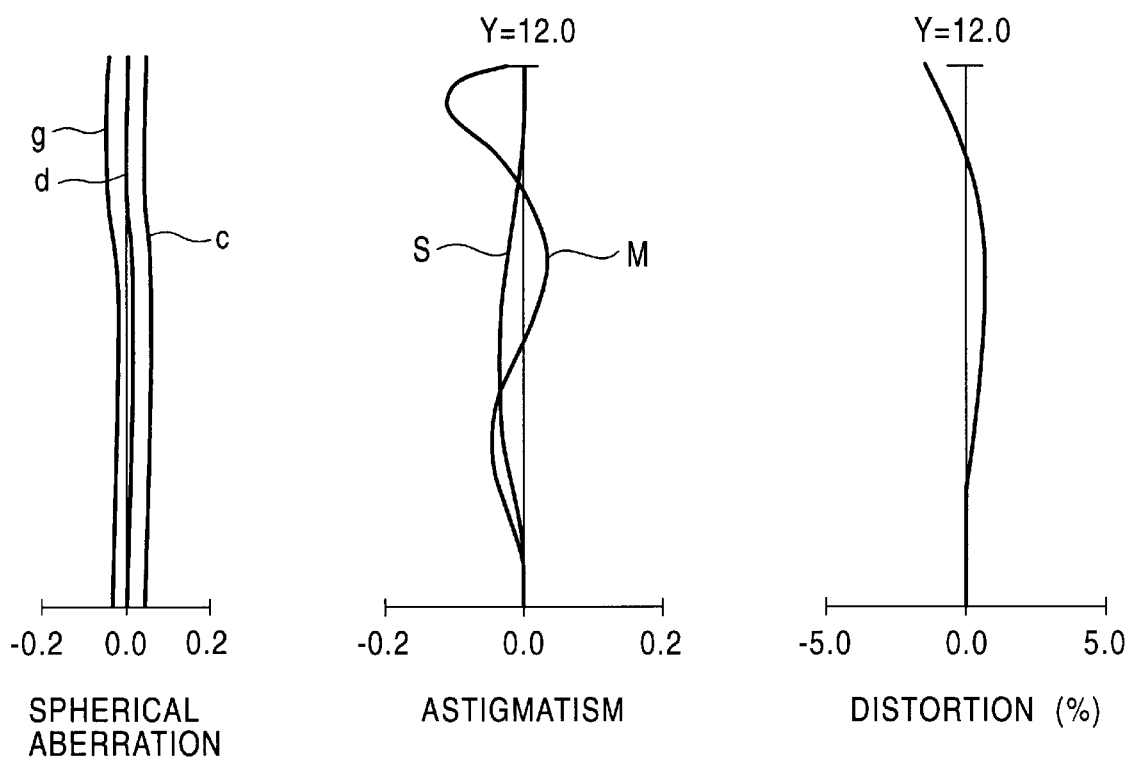
FIG. 27 illustrates spherical aberration, astigmatism, and distortion of the third embodiment of the projection lens.
Figure 28:
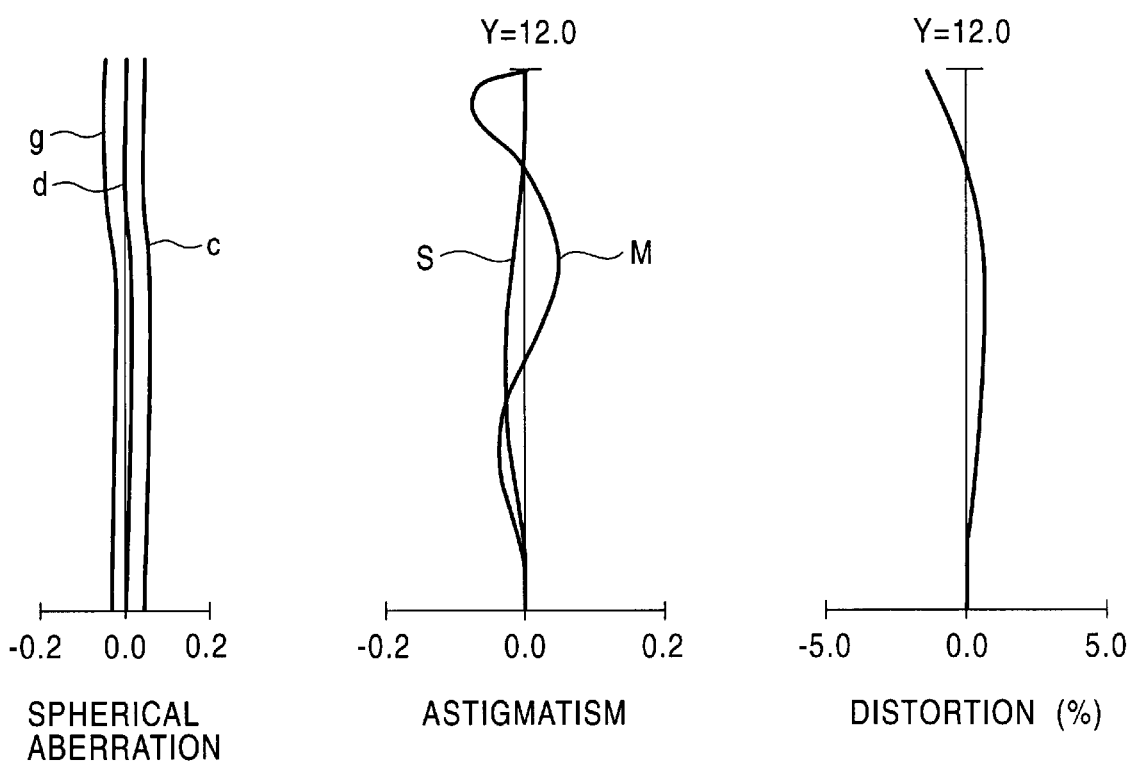
FIG. 28 illustrates spherical aberration, astigmatism, and distortion of the third embodiment of the projection lens.
Figure 29:
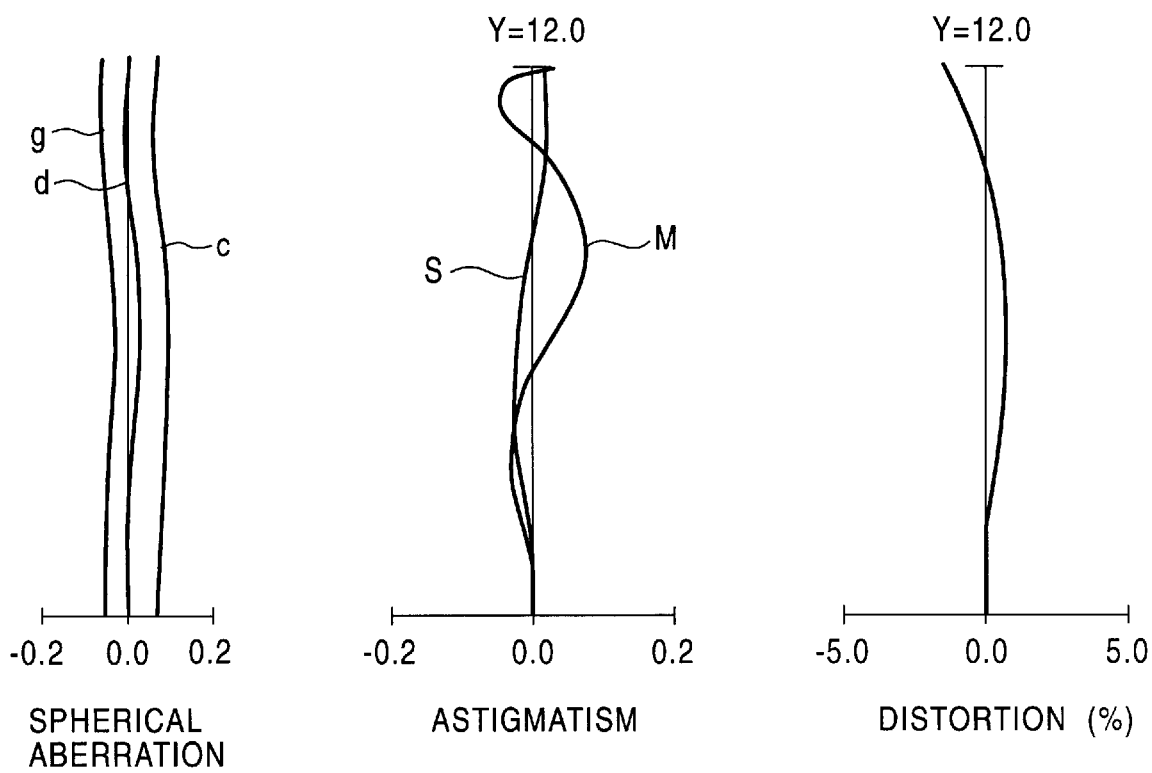
FIG. 29 illustrates spherical aberration, astigmatism, and distortion of the third embodiment of the projection lens.
Figure 30:
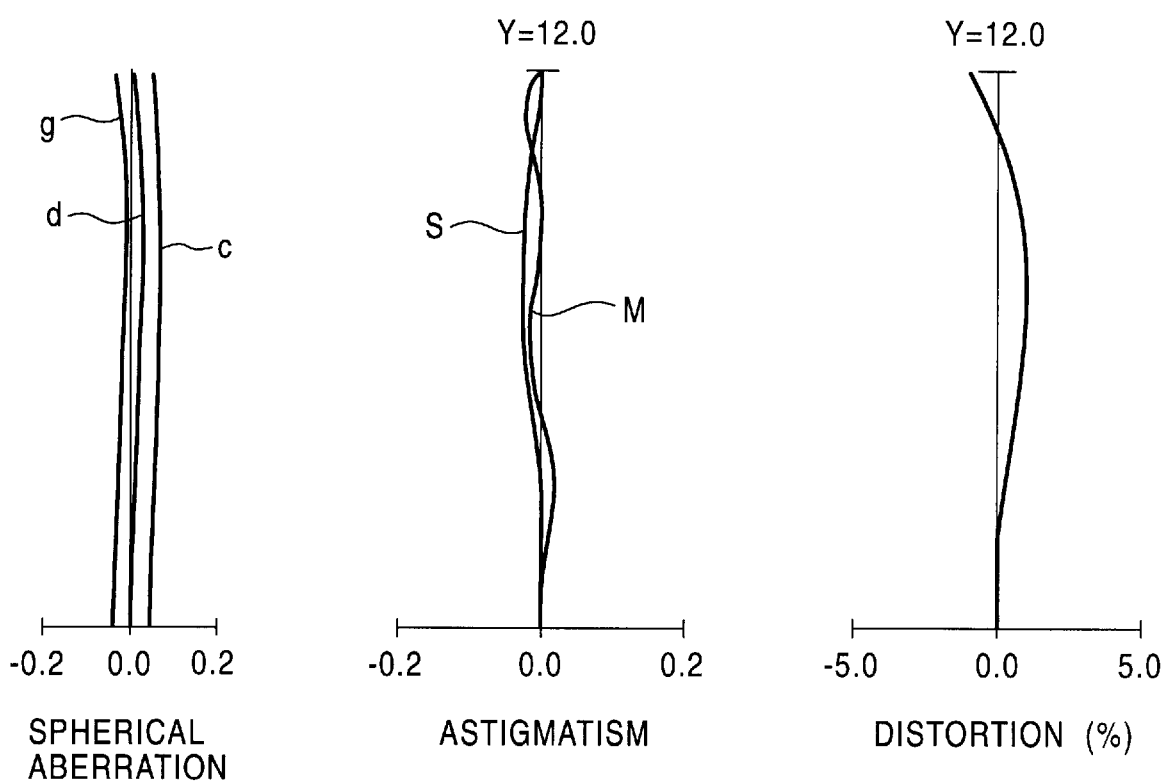
FIG. 30 illustrates spherical aberration, astigmatism, and distortion of the fourth embodiment of the projection lens.
Figure 31:
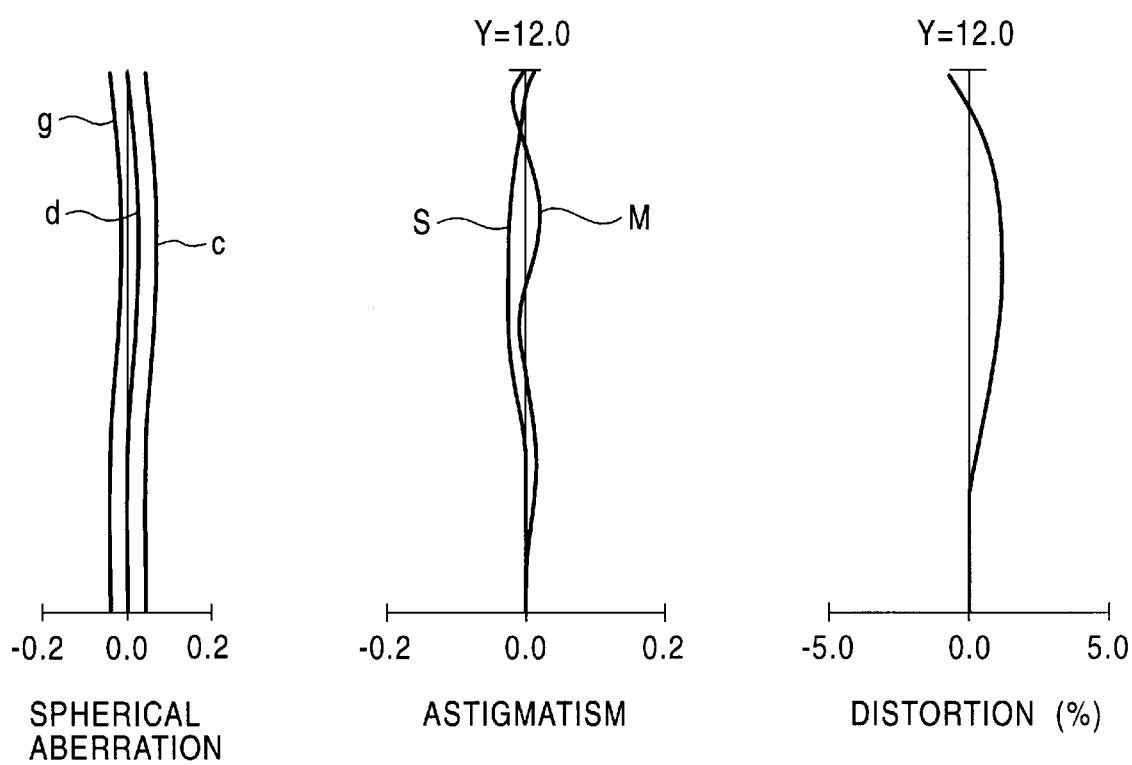
FIG. 31 illustrates spherical aberration, astigmatism, and distortion of the fourth embodiment of the projection lens.
Figure 32:
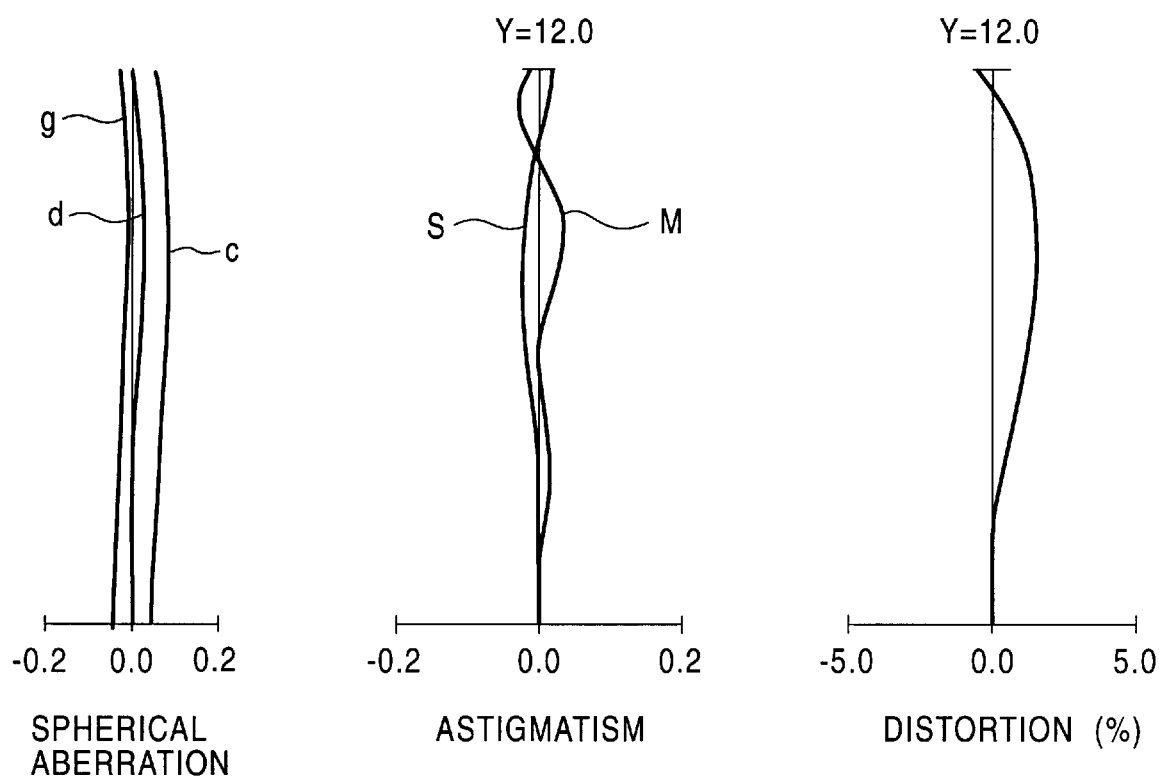
FIG. 32 illustrates spherical aberration, astigmatism, and distortion of the fourth embodiment of the projection lens.
Figure 33:
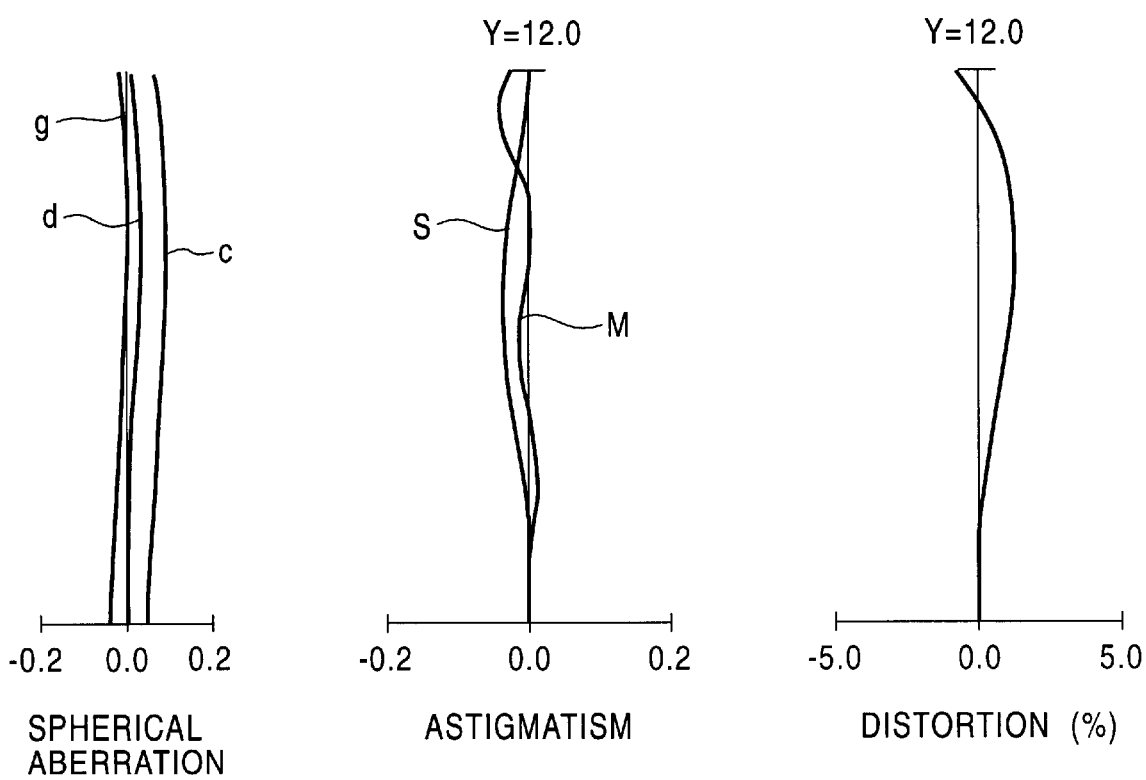
FIG. 33 illustrates spherical aberration, astigmatism, and distortion of the fifth embodiment of the projection lens.
Figure 34:
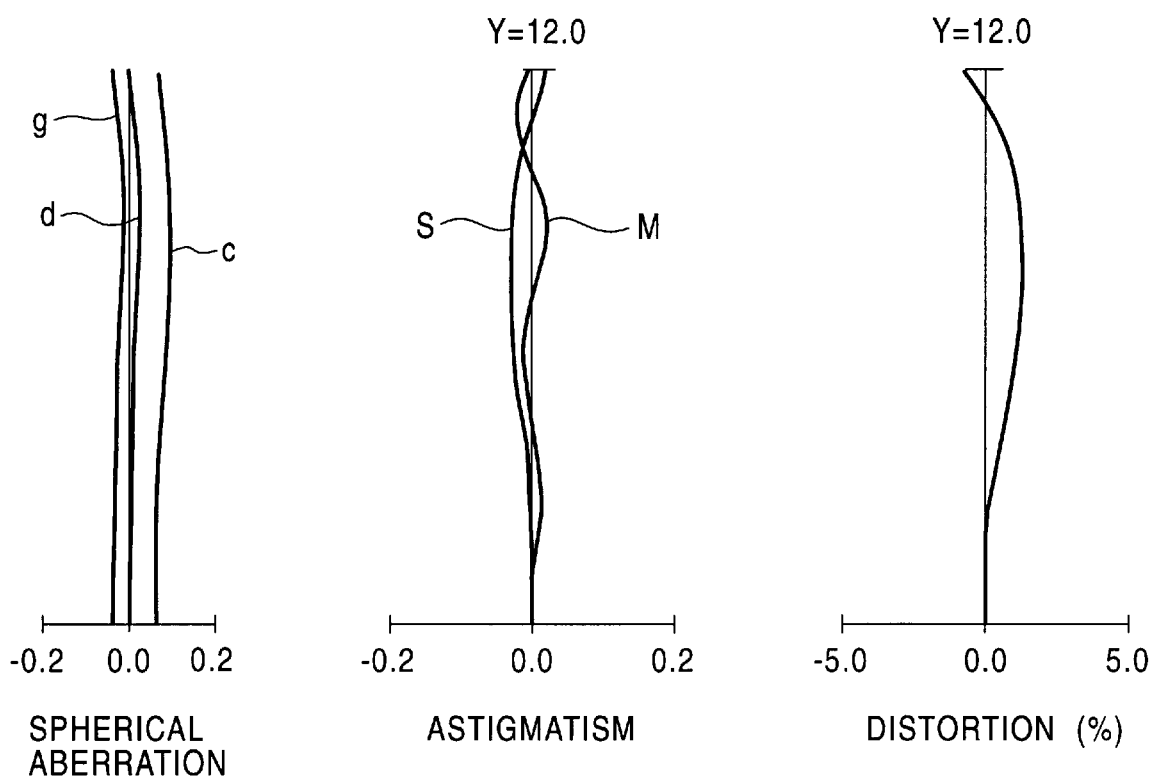
FIG. 34 illustrates spherical aberration, astigmatism, and distortion of the fifth embodiment of the projection lens.
Figure 35:
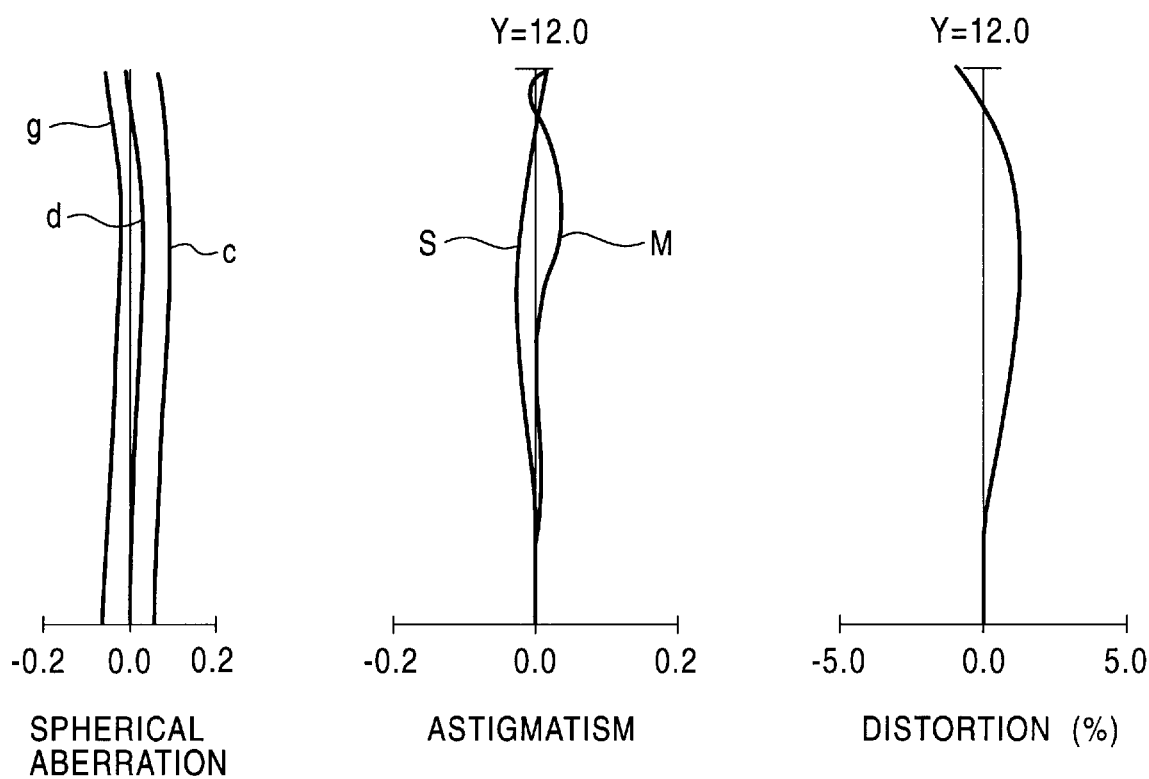
FIG. 35 illustrates spherical aberration, astigmatism, and distortion of the fifth embodiment of the projection lens.

FIG. 15 is a sectional view illustrating the configuration of the lenses of the fifth embodiment of the projection lens 20. The configuration of the lenses of the fifth embodiment of the projection lens 20 shown in FIG. 15 is similar to that of the fourth embodiment of the projection lens 20 shown in FIG. 14. Therefore, corresponding structural parts are given the same reference numerals, and are not described below.

In the projection lenses 20 of the first to fifth embodiments shown in FIGS. 11 to 15, respectively, in order to perform a focusing operation with changes in the projection magnification, the axial distance between predetermined lenses in the first lens group 100 (that is, the distance between lenses of an axial lens group) is changed. In other words, gaps between surfaces, that is, variable gaps VD1 in FIGS. 11 to 15 are varied.

Here, as shown in each of the first to third embodiments, when the first lens group 100 comprises two lens subgroups including a total of two lenses, the aspherical lens 101 and the positive lens 102, the lens gap between the aspherical lens 101 and the positive lens 102 corresponds to the variable gap VD1.

In the fourth embodiment, the first lens group 100 comprises three lens subgroups including a total of three lenses, the aspherical lens 101, the meniscus lens 103, and the positive lens 102. In the fourth embodiment, the lens gap between the aspherical lens 101 and the meniscus lens 103 corresponds to the variable gap VD1.

In the fifth embodiment, the first lens group 100 also comprises three lens subgroups including a total of three lenses, the aspherical lens 101, the meniscus lens 103, and the positive lens 102. In the fifth embodiment, the lens gap between the meniscus lens 103 and the positive lens 102 corresponds to the variable gap VD1.

3-2. Conditional expressions

Each first to fifth embodiment projection lens 20 having the corresponding above-described structure satisfies the following Conditional Expressions (1) to (5):

$$1.87 < BF/F \tag{1}$$

$$0.22 < HF2/F2 < 0.57 \tag{2}$$

where the focal length of the whole projection lens 20 is F, the distance in air from the last lens surface of the second lens group 200 to the small conjugate point when the projection magnification is a predetermined value is BF, the focal length of the second lens group 200 is F2, and the location of the front principal point of the second lens group 200 is HF2.

$$55.0 < vP \tag{3}$$

$$vN < 30.0 \tag{4}$$

where the Abbe number of the positive lens 203 having a positive refractive power in the combined lens 201 of the second lens group 200 is vP, and the Abbe number of the meniscus lens 202 having a negative refractive power in the combined lens 200 of the second lens group 200 is vN.

$$0.41 < t1G/F1P < 0.84 \tag{5}$$

where the longest lens gap in the first lens group 100 is t1G, and the focal length of the lens having a positive refractive power disposed closest to the diaphragm in the first lens group 100 is F1P.

These conditional expressions will be described.

For example, in the projection lenses of the projection display devices, as can be seen from the structures illustrated in FIGS. 2 to 7, an optical element, such as a color synthesizing dichroic mirror or dichroic prism, needs to be used, so that a long back focus is required. In the case where, for example, the size of the projection display device, that is, the size of a housing is to be decreased, it is necessary to decrease the focal length of the whole projection lens system in order to obtain a large screen when a short projection distance and a large angle of view are used.

Therefore, in order to, in the embodiments, satisfy Conditional Expression (1), the two conditions of decreasing the long back focus and the focal length of the whole projection lens system need to be achieved.

The Conditional Expression (2) provides a telecentric condition with regard to the location of the diaphragm 300 and the second lens group 200.

In general, a ray which passes through the front focal point of a lens is a parallel ray after passing through the lens. In the projection lens 20 of each embodiment, when the diaphragm is set in the vicinity of the front focal point of the second lens group 200, the principal ray which has exited from the short conjugate side approximates to a parallel ray, so that it is known that a telecentric property can be provided. In other words, the best telecentric property is provided when the location of the front focal point from the diaphragm 300 is at a distance corresponding to the focal length F2 of the second lens group 200. Conditional Expression (2) defines this condition.

Incidentally, if the telecentric property is lost, the symmetry between the upper ray and the lower ray is lost, so that the light intensity varies depending on the wavelength based on the angle characteristics of light transmitted through or reflected by a coated film of a prism or a mirror used for synthesizing color light beams or for a polarization beam splitter. This causes variations in light intensities and colors on the screen on which an image is projected.

Here, when the upper limit of Conditional Expression (2) is exceeded, the telecentric property cannot be obtained unless the refractive power of the second lens group 200 is made weaker. When an attempt is made to provide a telecentric property even though the upper limit of Conditional Expression (2) is exceeded, the back focus becomes short.

In contrast, when the lower limit of the Conditional Expression (2) is exceeded, the refractive power of the second lens group 200 becomes stronger, so that the refractive power of the first lens group 100 must be made stronger. Therefore, it becomes difficult to correct abaxial aberrations, and the lens diameter becomes large.

The Conditional Expressions (3) and (4) are provided to determine the Abbe numbers of lens materials. In particular, Conditional Expression (3) provides the condition for the Abbe number of the positive lens of the combined lens 201 having a strong refractive power. When the ranges of Conditional Expressions (3) and (4) are exceeded, chromatic aberration of magnification becomes large, making it easier for the projection screen to be colored at a corner.

The Conditional Expression (5) provides the condition for the first lens group 100 in order to cause an abaxial light beam which exits from the first lens group 100 to be incident upon the second lens group 200 in a properly balanced manner.

In an ordinary retrofocus-type projection lens, the long conjugate side has a negative refractive power, whereas the short conjugate side has a positive refractive power, with a diaphragm being disposed therebetween.

However, in the first lens groups 100 of the projection lens 20 of each embodiment, the lens subgroup which is disposed at the long conjugate side from the positive lens 102 closest to the diaphragm 300 is the front retrofocus-type lens subgroup, whereas the lens subgroup which is disposed at the short conjugate side from the positive lens 102 closest to the diaphragm 300 is the back retrofocus-type lens group. This makes it possible to cause an abaxial light beam which exits from the first lens group to be incident upon the second lens group in a properly balanced manner, so that the overall size of the whole lens system, the back focus, and the optical properties can be properly maintained.

When the upper limit of Conditional Expression (5) is exceeded, the overall length of the whole lens system becomes large, causing the outside diameter of the first lens group 100 to increase. When the focal length of the lens of the first lens group 100 having a positive refractive power and disposed closest to the diaphragm is decreased, the angle of the abaxial light beam incident upon the second lens group 200 becomes larger, making it difficult to correct aberrations. In contrast, when the lower limit of Conditional Expression (5) is exceeded, the refractive power of each lens of the first lens group 100 increases, causing aberrations to occur in relation to light beams passing in the periphery thereof, making it difficult to correct the aberrations.

3-3. Numerical examples

The numerical examples of the projection lenses 20 of the first to fifth embodiments described above are illustrated in FIGS. 16A to 20C, respectively.

In each of the FIGS. 16A, 17A, 18A, 19A, and 20A, i denotes a lens surface number counted from the long conjugate side. These lens surface numbers correspond to the lens surface numbers r1 to r15 (r13) in FIGS. 11 to 15. R represents the radius of curvature of a lens surface of the corresponding lens surface number i. D denotes a lens gap corresponding to the associated lens surface number i. ND denotes the refractive index of a lens for a wavelength of 587.56 mm with respect to the corresponding lens surface number i. VD denotes the Abbe number of the corresponding lens surface number i. In each of the FIGS. 16A, 17A, 18A, 19A, and 20A, F shown outside the corresponding table denotes the focal length of the corresponding projection lens, and Fno denotes the corresponding F number.

In each of the FIGS. 16A, 17A, 18A, 19A, and 20A, the optical element corresponding to the associated lens surface number is given, in addition to the lens surface numbers L1 to L6 (L5) shown in FIGS. 11 to 15.

In a rectangular coordinate system (X, Y, and Z) where the center of each surface is defined as the origin and the direction of the optical axis is defined as Z, the shapes of the lens surfaces as aspherical surfaces (that is, aspherical factors) in FIGS. 16B, 17B, 18B, 19B, and 20B are given by:

$$Z = \frac{(h^2/r)}{1 + \sqrt{1 - (1+K) \cdot (h^2/r^2)}} + \sum_{i=2}^{5} A_{2i} \cdot h^{2i}$$

-continued $$h = \sqrt{X^2 + Y^2}$$

where r represents the center radius of curvature, K represents the conic coefficient, and A4, A6, A8, and A10 represent fourth order, sixth order, eighth order, and 10th order aspherical factors, respectively.

FIGS. 16C, 17C, 18C, 19C, and 20C each give values of lens gaps in correspondence with predetermined projection magnifications in three steps. VD1 denotes a gap between predetermined lenses shown in FIGS. 11 to 15 which are sectional views showing the corresponding lenses. VD2 represents a gap between the short conjugate side of the light-synthesizing element 60 and the incident surface of the light valve 70. The specific location of each VD2 is also illustrated in each of the corresponding FIGS. 11 to 15.

FIGS. 21 to 35 each show spherical aberration, astigmatism, and distortion of the projection lens 20 of each of the first to fifth embodiments, respectively. Here, spherical aberration, astigmatism, and distortion in correspondence with each projection magnification in each of FIGS. 16C, 17C, 18C, 19C, and 20C are illustrated for each of the first to fifth embodiments.

In order to obtain results of the aberration graphs in each of the figures, though not shown in the numerical examples, the aberrations are calculated by taking into consideration each of the light-synthesizing elements 19, 19A and 19B shown in each of FIGS. 2 to 7 serving as a prism for synthesizing color light beams, or a parallel flat plate serving as the polarization beam splitter 54 having a center gap of 36 mm (a refractive index n=1.51633 and an Abbe number v=64.0). However, the numerical values of each of the color-synthesizing prisms do not affect the structure of each of the corresponding projection lenses of the present invention.

The actual structures of the projection lenses are not limited to those of the first to fifth embodiments shown in FIGS. 11 to 15. For example, the number of lenses of each of the lens groups may be changed as long as the conditions of the conditional expressions and the focusing method described above are satisfied. Adjustments carried out in the present invention allow aberrations of lenses to be corrected. Various aberrations that occur due to manufacturing errors of projection lenses can be corrected.

Although the projection lens of each of the above-described embodiments is described as being incorporated in projectors using liquid crystal panels or light valves as two-dimensional image display devices in a rear projection display device, they may also be used as, for example, a wide-angle projection lens in a single-lens reflex camera, an industrial camera, or electrophotography, or as a projection lens for a projection television using a CRT.

The above-described projection lenses of the present invention provide the following advantages.

The projection lens of each of the first to fifth embodiments performs a focusing operation with each projection magnification as a result of moving the gap between predetermined lenses of the first lens group. This makes it possible to provide a long back focus and to reduce the focal length of the whole projection lens (that is the overall length of the lens system) while reducing costs as a result of using fewer lenses in the whole projection lens than in conventional projection lenses. This makes it possible to reduce the size of the projection display device which includes any one of the projection lenses of the present invention.

It is possible to prevent a larger number of lenses from being used and to prevent the lens system from getting large.

In addition, it is possible to reduce curvature of field and barrel-shaped distortions at the short conjugate side. Further, it is possible to obtain telecentric properties between the diaphragm and the second lens group, and to prevent variations in color and strength of the projected image on the screen. In other words, high optical performance can be preserved even if few lenses are used as described above.

For the combined lenses of the second lens group, the Abbe number of the lens material is prescribed in order to reduce chromatic aberration of magnification and to make it difficult for corners of the projection screen from getting colored.

Since the first lens group is constructed so that an abaxial light beam which has exited from the first lens group impinges upon the second lens group in a properly balanced manner, the angle of the abaxial light beam incident upon the second lens group does not become steep, making it possible to easily correct aberrations. This is effective in reducing color misalignment at the periphery of the screen, even if the resolution of the lens increases as a result of an increase in the resolution of a light valve (a liquid crystal panel).

By prescribing the lens configuration or the shape of the lenses, various projection lenses can be obtained in the present invention, so that a suitable degree of freedom for selecting a lens structure suitable for, for example, the actual condition of use is obtained, and the optical properties of the above-described projection lenses can be enhanced.

What is claimed is:

1. A projection lens comprising:
   a first lens group, a diaphragm, and a second lens group, which are disposed in that order from a long conjugate side to a short conjugate side;
   wherein the first lens group comprises an aspherical lens disposed at the long conjugate side, and at least one positive lens, so that the first lens group as a whole has a positive refractive power,
   wherein the second lens group comprises at least one set of combined lenses and an aspherical lens, so that the second lens group as a whole has a positive refractive power,
   wherein a focusing operation is carried out by moving a gap between predetermined lenses in the first lens group, and conditional expressions (1) and (2) are satisfied:

$1.87 < BF/F$  Conditional expression (1)

$0.22 < HF2/F2 < 0.57$  Conditional expression (2)

where F denotes a focal length of the projection lens, BF denotes a distance in air from a last lens surface of the second lens group to a small conjugate point when a projection magnification is a predetermined value, F2 denotes a focal length of the second lens group, and HF2 denotes a location of a front principal point of the second lens group.

2. The projection lens according to claim 1, wherein the aspherical lens of the first lens group is such that a negative refractive power thereof becomes stronger from an optical axis center to a vicinity thereof.

3. The projection lens according to claim 1, wherein the at least one positive lens of the first lens group is disposed in contact with the diaphragm or at a predetermined distance close to the diaphragm.

4. The projection lens according to claim 1, wherein the at least one set of combined lenses in the second lens group comprise a combination of a lens having a negative refractive power and a positive lens having a positive refractive power, which are disposed in that order from the long conjugate side to the short conjugate side, and wherein conditional expressions (3) and (4) are satisfied:

$$55.0 < \nu P \quad \text{Conditional expression (3)}$$

$$\nu N < 33.0 \quad \text{Conditional expression (4)}$$

where νP denotes an Abbe number of the positive lens having a positive refractive power of the at least one set of combined lenses of the second lens group, and νN denotes an Abbe number of the lens having a negative refractive power of the at least one set of combined lenses of the second lens group.

5. A projection lens comprising:
a first lens group, a diaphragm, and a second lens group, which are disposed in that order from a long conjugate side to a short conjugate side;
wherein the first lens group comprises a convex-shaped meniscus lens disposed at the long conjugate side and at least one positive lens, so that the first lens group as a whole has a positive refractive power,
wherein the second lens group comprises at least one set of combined lenses and an aspherical lens, so that the second lens group as a whole has a positive refractive power,
wherein a gap between predetermined lenses of the first lens group is moved in order to perform a focusing operation, and conditional expressions (5) and (6) are satisfied:

$$1.87 < BF/F \quad \text{Conditional expression (5)}$$

$$0.22 < HF2/F2 < 0.57 \quad \text{Conditional expression (6)}$$

where F denotes a focal length of the projection lens, BF denotes a distance in air from a last lens surface of the second lens group to a small conjugate point when a projection magnification is a predetermined value, F2 denotes a focal length of the second lens group, and HF2 denotes a location of a front principal point of the second lens group.

6. The projection lens according to claim 5, wherein the meniscus lens of the first lens group is an aspherical lens, and has a negative refractive power which increases from an optical axis center to a vicinity thereof.

7. The projection lens according to claim 5, wherein the at least one positive lens of the first lens group is disposed in contact with the diaphragm or at a predetermined distance close to the diaphragm.

8. The projection lens according to claim 5, wherein a long lens gap in the projection lens is disposed behind the convex-shaped meniscus lens of the first lens group, and wherein conditional expression (7) is satisfied:

$$0.41 < t1G/F1P < 0.84 \quad \text{Conditional expression (7)}$$

where t1G denotes a longest lens gap in the first lens group, and F1P denotes a focal length of a lens having a positive refractive power disposed closest to the diaphragm in the first lens group.

9. The projection lens according to claim 5, wherein the at least one set of combined lenses in the second lens group comprise a combination of a lens having a negative refractive power and a positive lens having a positive refractive power, which are disposed in that order from the long conjugate side to the short conjugate side, and wherein conditional expressions (8) and (9) are satisfied:

$$55.0 < \nu P \quad \text{Conditional expression (8)}$$

$$\nu N < 30.0 \quad \text{Conditional expression (9)}$$

where νP denotes an Abbe number of the positive lens having a positive refractive power of the at least one set of combined lenses of the second lens group, and νN denotes an Abbe number of the lens having a negative refractive power of the at least one set of combined lenses of the second lens group.

10. A projection lens comprising:
a first lens group, a diaphragm, and a second lens group, which are disposed in that order from a long conjugate side to a short conjugate side,
wherein the first lens group comprises two lens subgroups comprising two lenses, an aspherical lens disposed at the long conjugate side, and a positive lens, so that the first lens group as a whole has a positive refractive power,
wherein the second lens group comprises two lens subgroups comprising three lenses, a set of combined lenses and an aspherical lens, so that the second lens group as a whole has a positive refractive power,
wherein a gap between predetermined lenses in the first lens group is moved in order to perform a focusing operation, and conditional expressions (10) and (11) are satisfied:

$$1.87 < BF/F \quad \text{Conditional expression (10)}$$

$$0.22 < HF2/F2 < 0.57 \quad \text{Conditional expression (11)}$$

where F denotes a focal length of the projection lens, BF denotes a distance in air from a last lens surface of the second lens group to a small conjugate point when a projection magnification is a predetermined value, F2 denotes a focal length of the second lens group, and HF2 denotes a location of a front principal point of the second lens group.

11. The projection lens according to claim 10, wherein the aspherical lens of the first lens group is such that a negative refractive power thereof becomes stronger from an optical axis center to a vicinity thereof.

12. The projection lens according to claim 10, wherein the positive lens of the first lens group is disposed in contact with the diaphragm or at a predetermined distance close to the diaphragm.

13. The projection lens according to claim 10, wherein a longest lens gap in the projection lens is disposed between the positive lens and the aspherical lens of the first lens group, and wherein conditional expression (12) is satisfied:

$$0.41 < t1G/F1P < 0.84 \quad \text{Conditional expression (12)}$$

where t1G denotes a longest lens gap in the first lens group, and F1P denotes a focal length of a lens having a positive refractive power disposed closest to the diaphragm in the first lens group.

14. The projection lens according to claim 10, wherein the set of combined lenses in the second lens group comprise a combination of a meniscus lens having a negative refractive power and a positive lens having a positive refractive power, which are disposed in that order from the long conjugate side to the short conjugate side, and wherein conditional expressions (13) and (14) are satisfied:

$$55.0 < \nu P \qquad \text{Conditional expression (13)}$$

$$\nu N < 30.0 \qquad \text{Conditional expression (14)}$$

where νP is an Abbe number of the positive lens having a positive refractive power of the set of combined lenses of the second lens group, and νN denotes an Abbe number of the meniscus lens having a negative refractive power of the set of combined lenses of the second lens group.

15. A projection lens comprising:
a first lens group, a diaphragm, and a second lens group, which are disposed in that order from a long conjugate side to a short conjugate side,
wherein the first lens group comprises two lens subgroups comprising two lenses, an aspherical lens disposed at the long conjugate side, and a positive lens, so that the first lens group as a whole has a positive refractive power,
wherein the second lens group comprises either two lens subgroups or three lens subgroups, the two lens subgroups comprising three lenses, an aspherical lens disposed closest to the diaphragm, and combined lenses, and the three lens subgroups comprising four lenses, an aspherical lens disposed closest to the diaphragm, a positive lens, and combined lenses, so that the second lens group as a whole has a positive refractive power,
wherein a gap between predetermined lenses in the first lens group is moved to perform a focusing operation, and conditional expressions (15) and (16) are satisfied:

$$1.87 < BF/F \qquad \text{Conditional expression (15)}$$

$$0.22 < HF2/F2 < 0.57 \qquad \text{Conditional expression (16)}$$

where F denotes a focal distance of the projection lens, BF denotes a distance in air from a last lens surface of the second lens group to a small conjugate point when a projection magnification is a predetermined value, F2 is a focal length of the second lens group, and HF2 is a location of a front focal point of the second lens group.

16. The projection lens according to claim 15, wherein the aspherical lens of the first lens group is such that a negative refractive power thereof becomes stronger from an optical axis center to a vicinity thereof.

17. The projection lens according to claim 15, wherein the positive lens of the first lens group is disposed in contact with the diaphragm or at a predetermined distance close to the diaphragm.

18. The projection lens according to claim 15, wherein a longest lens gap in the projection lens is disposed between the positive lens and the aspherical lens of the first lens group, and wherein conditional expression (17) is satisfied:

$$0.41 < t1G/F1P < 0.84 \qquad \text{Conditional expression (17)}$$

where t1G denotes a longest lens gap in the first lens group, and F1P denotes a focal length of the lens having a positive refractive power disposed closest to the diaphragm in the first lens group.

19. The projection lens according to claim 15, wherein the combined lenses in the second lens group comprise a combination of a meniscus lens having a negative refractive power and a positive lens having a positive refractive power, which are disposed in that order from the long conjugate side to the short conjugate side, and wherein conditional expressions (18) and (19) are satisfied:

$$55.0 < \nu P \qquad \text{Conditional expression (18)}$$

$$\nu N < 30.0 \qquad \text{Conditional expression (19)}$$

where νP is an Abbe number of the positive lens having a positive refractive power of the combined lenses of the second lens group, and νN denotes an Abbe number of the meniscus lens having a negative refractive power of the combined lenses of the second lens group.

20. The projection lens according to claim 15, wherein both surfaces of the aspherical lens in the second lens group are convex-shaped surfaces at the short conjugate side.

21. A projection lens comprising:
a first lens group, a diaphragm, and a second lens group, which are disposed in that order from a long conjugate side to a short conjugate side,
wherein the first lens group comprises either two lens subgroups or three lens subgroups, the two lens subgroups comprising two lenses, an aspherical lens disposed at the long conjugate side and a positive lens, and the three lens subgroups comprising three lenses, an aspherical lens disposed at the long conjugate side, a negative meniscus lens, and a positive lens, so that the first lens group as a whole has a positive refractive power,
wherein the second lens group comprises two lens subgroups including three lenses, a set of combined lenses and an aspherical lens disposed at a short conjugate side, so that the second lens group has as a whole a positive refractive power,
wherein a gap between predetermined lenses in the first lens group is moved to perform a focusing operation, and conditional expressions (20) and (21) are satisfied:

$$1.87 < BF/F \qquad \text{Conditional expression (20)}$$

$$0.22 < HF2/F2 < 0.57 \qquad \text{Conditional expression (21)}$$

where F is a focal length of the projection lens, BF is a distance in air from a last lens surface of the second lens group to a small conjugate point when a projection magnification is a predetermined value, F2 is a focal length of the second lens group, and HF2 is a location of a front principal point of the second lens group.

22. The projection lens according to claim 21, wherein the aspherical lens of the first lens group is such that a negative refractive power thereof becomes stronger from an optical axis center to a vicinity thereof.

23. The projection lens according to claim 21, wherein the positive lens of the first lens group is disposed in contact with the diaphragm or at a predetermined distance close to the diaphragm.

24. The projection lens according to claim 21, wherein, in the projection lens, a longest lens gap in the projection lens is disposed between the diaphragm and the second lens group.

25. The projection lens according to claim 21, wherein a longest lens gap in the projection lens is disposed between the positive lens and the aspherical lens of the first lens group, and wherein conditional expression (22) is satisfied:

$$0.41 < t1G/F1P < 0.84 \qquad \text{Conditional expression (22)}$$

where t1G denotes a longest lens gap in the first lens group, and F1P denotes a focal length of a lens having a positive refractive power disposed closest to the diaphragm in the first lens group.

26. The projection lens according to claim 21, wherein the set of combined lenses in the second lens group comprise a combination of a meniscus lens having a negative refractive power and a positive lens having a positive refractive power, which are disposed in that order from the long conjugate aside to the short conjugate side, and wherein conditional expressions (23) and (24) are satisfied:

$$55.0 < \nu P \qquad \text{Conditional expression (23)}$$

$$\nu N < 30.0 \qquad \text{Conditional expression (24)}$$

where $\nu P$ is an Abbe number of the positive lens having a positive refractive power of the set of combined lenses of the second lens group, and $\nu N$ denotes an Abbe number of the meniscus lens having a negative refractive power of the set of combined lenses of the second lens group.

27. The projection lens according to claim 21, wherein the aspherical lens in the second lens group is a biconvex lens.

* * * * *